United States Patent
Liu et al.

(10) Patent No.: US 9,446,876 B2
(45) Date of Patent: Sep. 20, 2016

(54) COOKING MATERIAL DISPENSING METHOD AND DISPENSING SYSTEM

(75) Inventors: Xinyu Liu, Shenzhen (CN); Ping Yan, Shenzhen (CN)

(73) Assignee: Xinyu Liu, Shenzhen (CN)

( * ) Notice: Subject to any disclaimer, the term of this patent is extended or adjusted under 35 U.S.C. 154(b) by 239 days.

(21) Appl. No.: 14/373,253

(22) PCT Filed: Jan. 19, 2012

(86) PCT No.: PCT/CN2012/070573
§ 371 (c)(1),
(2), (4) Date: Oct. 20, 2014

(87) PCT Pub. No.: WO2013/107019
PCT Pub. Date: Jul. 25, 2013

(65) Prior Publication Data
US 2015/0128536 A1    May 14, 2015

(51) Int. Cl.
*B65B 69/00* (2006.01)
*A47J 36/14* (2006.01)
(Continued)

(52) U.S. Cl.
CPC ............ *B65B 69/0008* (2013.01); *A23L 3/001* (2013.01); *A47J 36/34* (2013.01); *A47J 37/045* (2013.01);
(Continued)

(58) Field of Classification Search
CPC .......... B65B 69/0008; B65B 69/0075; B65B 69/005; B01F 13/008; B01F 15/0085; B01F 11/00; B65G 47/252; B65G 47/248; A23L 3/001; A47J 36/34; A47J 43/00; A47J 37/045

USPC .......................... 366/185; 414/404, 405, 480
See application file for complete search history.

(56) References Cited

U.S. PATENT DOCUMENTS 1,911,525 A * 5/1933 Neuman ............. B65B 69/0008
198/560
2,571,781 A * 10/1951 Sutch .................. B65B 69/0008
414/412
(Continued)

FOREIGN PATENT DOCUMENTS

CN              1807196 A       7/2006
CN            101103880 A       1/2008
(Continued)

*Primary Examiner* — Tony G Soohoo

(57) ABSTRACT

Disclosed are a cooking material dispensing system and dispensing method. The dispensing method comprises the following steps: setting a material bag (9) clamping station in a position near a cooking pot opening but outside the range of the pot opening, and clamping the material bag (9) containing a cooking material at the material bag (9) clamping station; confining the material bag (9), such that the material bag (9) is kept in a clamped state to control the deformation thereof during the dispensing procedure; flipping and/or tipping the material bag (9), and when in a position near the cooking pot opening, dispensing the cooking material in the material bag (9) into the cooking pot; and once the cooking material has been dispensed, shifting the material bag (9) from the range of the cooking pot opening and releasing the clamping of the material bag (9). The cooking material dispensing system comprises a dispensing device capable of clamping, confining, and transferring the material bag (9) and flipping the opened material bag and/or tipping the cooking material into the cooking pot. The dispensing system and dispensing method take a material packaged in the material bag (9) and can accurately move the material bag (9) into the dispensing position, making the cooking process convenient, fast and simple, and the entire process will not be contaminated.

17 Claims, 32 Drawing Sheets

(51) Int. Cl.
*A47J 43/00* (2006.01)
*B01F 11/00* (2006.01)
*B01F 15/02* (2006.01)
*B65G 47/248* (2006.01)
*B65G 47/252* (2006.01)
*A23L 3/00* (2006.01)
*A47J 37/04* (2006.01)
*A47J 36/34* (2006.01)
*B01F 15/00* (2006.01)
*B01F 13/00* (2006.01)

(52) U.S. Cl.
CPC .............. *A47J 43/00* (2013.01); *B65B 69/005* (2013.01); *B65B 69/0075* (2013.01); *B65G 47/248* (2013.01); *B65G 47/252* (2013.01); *B01F 11/00* (2013.01); *B01F 13/0098* (2013.01); *B01F 15/0085* (2013.01)

(56) References Cited

U.S. PATENT DOCUMENTS

| | | | | |
|---|---|---|---|---|
| 2,660,324 A * | 11/1953 | Trautschold | B65B 69/0008 414/412 |
| 2,930,501 A * | 3/1960 | Cotterell | B65B 69/0008 414/412 |
| 3,250,373 A * | 5/1966 | Yanoshita | B65G 47/248 198/379 |
| 3,340,790 A * | 9/1967 | Simjian | A47F 1/00 221/150 HC |
| 3,467,267 A * | 9/1969 | Van Elten | B65B 69/0008 414/412 |
| 3,482,718 A * | 12/1969 | Moriarty | B65B 69/0008 414/412 |
| 3,664,530 A * | 5/1972 | Takiguchi | B65B 69/0008 414/412 |
| 3,757,973 A * | 9/1973 | Lambert | B65B 69/0008 30/2 |
| 4,119,227 A * | 10/1978 | Hafner | B65B 69/0008 414/412 |
| 4,412,482 A * | 11/1983 | Janssen | A47J 36/20 99/359 |
| 4,732,080 A * | 3/1988 | Vita | A23L 1/1613 99/330 |
| 4,784,297 A * | 11/1988 | Katz | B67D 3/00 222/161 |
| 4,801,050 A * | 1/1989 | Bell | B67D 3/041 222/212 |
| 4,817,824 A * | 4/1989 | LaFleur | B65D 90/205 206/600 |
| 5,190,429 A * | 3/1993 | Harlegard | B65B 69/0008 141/330 |
| 5,211,702 A * | 5/1993 | Tanaka | B65G 1/1376 414/404 |
| 5,241,899 A * | 9/1993 | Kuhlman | A21B 5/06 118/16 |
| 5,341,854 A * | 8/1994 | Zezulka | A61J 1/20 141/1 |
| 5,344,048 A * | 9/1994 | Bonerb | B65B 69/0075 222/105 |
| 5,495,932 A * | 3/1996 | Dyess | B65G 47/252 198/416 |
| 5,622,471 A * | 4/1997 | Sommer, Jr. | B65B 69/0008 241/DIG. 38 |
| 5,682,929 A * | 11/1997 | Maginot | B65B 1/16 141/10 |
| 5,873,492 A * | 2/1999 | Sullivan | B05C 17/00516 222/105 |
| 5,944,470 A * | 8/1999 | Bonerb | B65B 69/0091 222/166 |
| 6,039,214 A * | 3/2000 | Hewett | B67D 3/00 222/105 |
| 6,708,741 B1 * | 3/2004 | Berry | B67D 3/0009 141/351 |
| 7,168,459 B2 * | 1/2007 | Bibbo | A61L 2/02 141/10 |
| 2004/0144800 A1 * | 7/2004 | Danby | B65D 77/30 222/105 |
| 2004/0159244 A1 | 8/2004 | Leason | |
| 2004/0159676 A1 * | 8/2004 | Adema | B01F 13/1058 222/144 |
| 2006/0054637 A1 * | 3/2006 | Doogan | B65B 69/0008 222/181.2 |
| 2012/0151877 A1 * | 6/2012 | Stamm Kristensen | A23N 17/007 53/411 |
| 2012/0213620 A1 * | 8/2012 | Marovic | B65B 69/0008 414/412 |
| 2015/0021356 A1 * | 1/2015 | Witchell | G01F 1/42 222/23 |
| 2015/0128536 A1 * | 5/2015 | Liu | A47J 37/045 53/492 |

FOREIGN PATENT DOCUMENTS

CN 101467842 A 7/2009
CN 101637357 A 2/2010

* cited by examiner

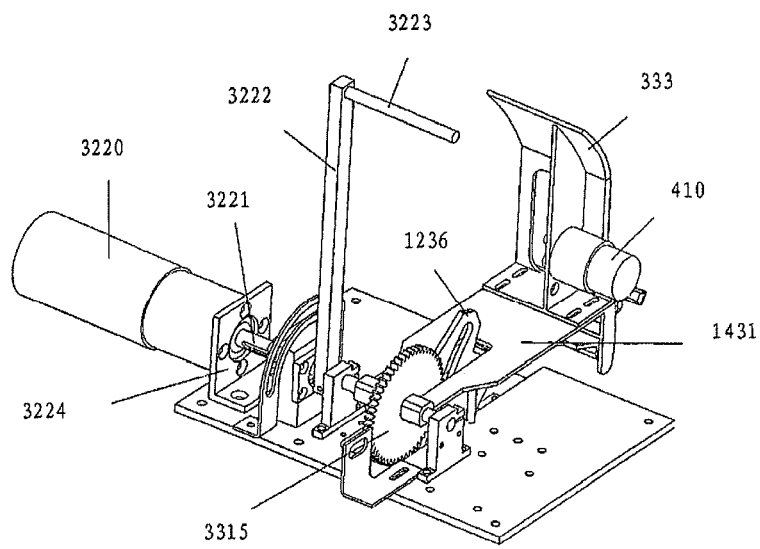
Figure 40
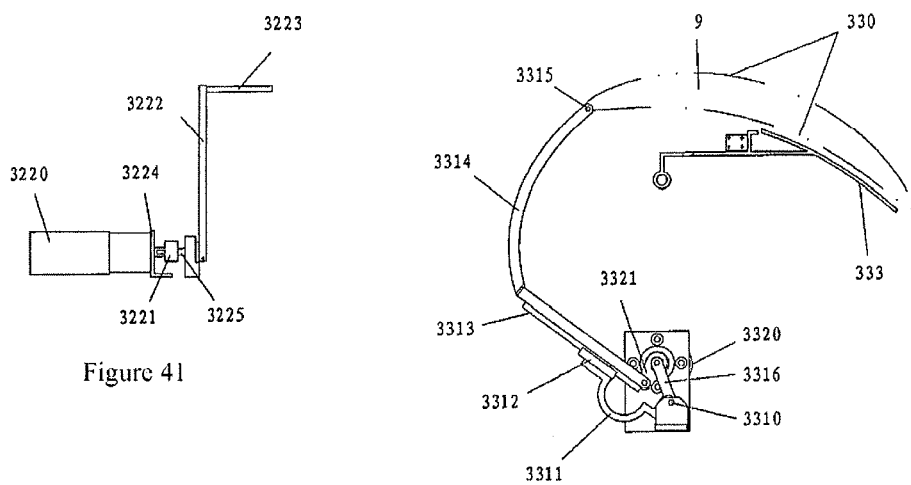
Figure 41
Figure 42

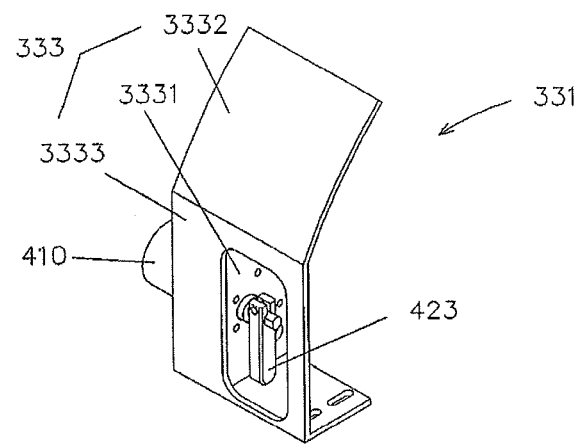
Figure 43
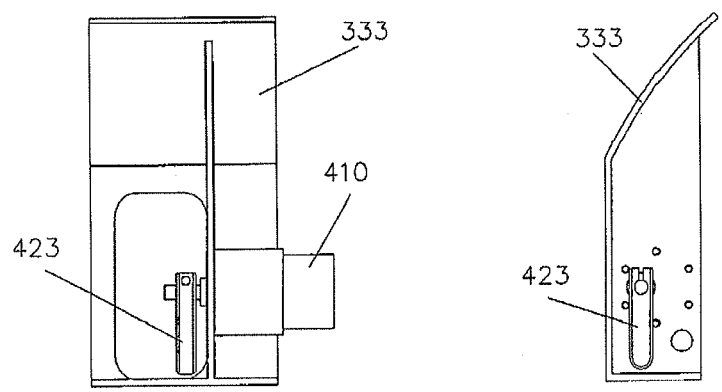
Figure 44
Figure 45

COOKING MATERIAL DISPENSING METHOD AND DISPENSING SYSTEM

FIELD OF THE INVENTION

The present invention relates to the technical field of cooking. More particularly, the present invention relates to a feeding method for inputting cooking ingredients contained in an ingredient bag into a cooking pot under the control of a control system and a feeding system based on this feeding method.

BACKGROUND OF THE INVENTION

With the continuous progress and development of society, people have become increasingly demanding on the quality of their life, and increasing attention has also been made to their diets. However, the pace of life has become increasingly fast. Coming home fatigue and exhausted after a hard day's work, people are increasingly unwilling to prepare meals and hope to free themselves from heavy housework so that they may pursue more leisure activities.

In the traditional cooking process, the cook does all things, from selecting and matching of cooking ingredients, inputting the ingredient into the pot, cooking the food, removing the food from the pot, to arranging the dish. Cooking skills vary from person to person, and thus the skill of the cook determines the look and taste of the dish. More importantly, the cooking process is not only labor intensive, but the long hours working among the heat and fume in the kitchen also leads to various kitchen diseases. Therefore, human cooking labor is being gradually replaced by the machines in doing some cooking work. Robots have also appeared to perform some tedious cooking tasks in the kitchen. Since the cooking process of the robots is based on expert systems, the dish is ensured to be well balanced in their nutrition. Since the cooking time and the duration and degree of heating are predetermined, more desirable look and taste of the dish is guaranteed. The result is that, even at home, people can now be served with dishes of top quality. In addition, freeing people from kitchen diseases is also a blessing to their health.

Presently, among the prior art technical information related to cooking robots, most of the methods and systems for feeding the ingredients involve inputting the ingredients contained in a cartridge into a cooking pot through a feeding mechanism, under the control of a control system. For example, CN patent 200610033780.5 entitled "Automatic Feeding Apparatus in a Cooking Device" discloses inputting the ingredients prepared in a cartridge according to a predetermined program into a cooking device/system, the feeding device comprising a frame body and a film clamper; wherein the film clamper consists of two film clamping bodies and moves within the frame body and, the two film clamping bodies bond with each other by their relative movement and then clamp the packaging film of the cartridge. The cartridge and the film clamper generate a relative movement to open the packaging film of the cartridge. However, since the cartridge has a length and a width, and the packaging film are generally sealed around the cartridge, and thus using the relative movement produced between the film clamper and the cartridge to open the cartridge may result in incomplete or unreliable opening of the packaging film. In addition, the production costs of the cartridge and packaging film is actually quite high.

Similarly, CN utility model 200820123775.8 provides "A Feeding Apparatus for Automatic Cooking System," which comprises a plurality of cartridges, a moving means for accommodating and moving the cartridges. The moving means is disposed at one side of a cooking pot; a turning mechanism is arranged at the centerline at the same side of the pot, and the turning mechanism clamps the cartridge and turns it over, so that ingredients inside the cartridge are poured into the center of the pot. Compared with the prior art, the ingredient cartridge of the feeding device does not requires packaging the cartridge containing cooking ingredients with a plastic film, and also eliminates the complicated mechanism for tearing the film. However, it is also disadvantageous in that the ingredient cartridge is not sealed and thus places certain requirements on the cooking environment, and does not facilitate the preservation, the automatic processing, the packaging and transportation of the ingredients prior to the actual cooking.

The prior art also provides an automatic cooking machine. The machine seals the cooking ingredients in ingredient bags, and then the different ingredients are put into different ingredient bags according to the order of adding the ingredients in the cooking process and the two ends of the ingredient bags are each connected to two conveyor belts along the longitudinal direction of the ingredient bags, i.e. the ingredient bags are placed horizontally and clamped between the two conveyor belts, similar to the structure of a bullet belt. A cutting tool is arranged over the pot and between the two conveyor belts. When in an operation mode, the clamped ingredient bags are conveyed by a conveying means until the ingredient bags are over the pot, and when the ingredient bags are over the pot, they are cut open by a cutting tool, so that ingredients inside the ingredient bags fall into the pot. However, this machine is disadvantageous in that:

(1) The complex structure of the entire cooking system is inclined to result in the mutual interferences of different mechanisms.

(2) Since the pot is a component that requires frequent cleaning, arranging two conveyor belts and a cutting tool over the pot makes its cleaning troublesome.

(3) It is also quite complicated and troublesome to assemble and disassemble the ingredient bag clamped by the conveyor belts.

(4) During the entire process from the start of the feeding process to the completion of the feeding, the ingredient bag remains over the pot, and it is thus inclined to be affected by the continuous thermal radiation or smog generated when the pot is being heated, and the quality of the cooking is thus impaired. In addition, in case that the ingredient bag fails to pour the ingredients completely into the pot, it is possible that the ingredients intermittently leak into the pot and thus would also seriously impair the quality of the cooking.

(5) After being cut, the ingredient bag would have a movement similar to pendulum movement, and hence the ingredients in the ingredient bag are unable to fall into a desired area. The desired area refers to the appropriate position that the cooking ingredients should be located in the cooking pot according to the object point of the cooking utensils, the requirements of the cooking technique and the actual needs of the cook. The appropriate position is within the desired area, and it means that when the cooking ingredients are in this position, the ingredients can be heated and/or stirred in an effective, uniform and/or desirable manner. Usually the appropriate position locates within an inner area around the heated center of the cooking pot, or within an area covered by a heat-transfer medium (such as oil) and the like, and should be smaller than the entire inner area of the cooking pot. One example is the Chinese wok.

When the heat source is located in the central portion of the wok, the area near the central portion (e.g. if with the central point of the wok as the center of a circle, it is an area that has a diameter of about 5-15 cm extending from the center of the circle, or a smaller area) is the appropriate position. Outside this area, the temperature of the wok decreases rapidly, and may thus become inappropriate position. The appropriate position can, of course, be the entire range of the cooking pot. For example when using a small wok or a special shaped wok, or when the wok needs to be turned-over in a wide angle (e.g., 180-degree turn, 360 degree turn of the wok etc.), or when the entire wok is evenly heated. The so-called inappropriate position is the place where the cooking ingredients are difficult to or even can not be turned-over or stirred evenly and effectively by a turning-over means or a stirring means, the place where the cooking ingredients are difficult to or even can not go back to the appropriate position, the place where the cooking ingredients are difficult to or even can not be gathered to the desired area in the cooking pot, the place where the cooking ingredients are difficult to or even can not be heated evenly and effectively, and/or the place where it is not advantageous to a cooking process. For example, such an inappropriate position could be a blind area where a turning-over means or a stirring means can not reach, an area where a good turning-over effect can not be obtained although a turning-over means or a stirring means can reach there, an area which is beyond the turning-over/stirring range or even out of the cooking pot, or an area where the control system of a cooking utensil or a cooking machine is difficult to or can not detect the existence of the cooking ingredients although it is in the area where it could be turned-over or stirred but it fails to be turned-over or stirred. When the appropriate position extends to the whole inner area of the cooking pot then the inappropriate position is the area which is out of the cooking pot. The quality of dish can be impaired seriously under the foresaid circumstances, and it may even lead to the failure of the cooking.

(6) The area over the pot is an important area for conducting various operations. If the feeding means is disposed over the pot, it will reduce the operation space of other means, e.g. a mixing means. In addition, if disposed over the pot, the feeding means would easily be grimed by the fume and damaged by the heat. If the feeding means grimed, it would be difficult to clean the grime and the grime may drop into the pot and contaminate the dish.

CN patent application entitled "Cooking Ingredient Packaging and a Method for Feeding the Ingredient Using the Packaging" (Application No.: 200410052197.x) also discloses a feeding method of ingredient packages, comprising separately placing each package in the periphery of a rotatable package fixing means, and when the rotatable package fixing means comes to the feeding position over the pot, the motor actuates the fixing means to rotate, so that the first package is below the fixing means and one end of the package is cut open by a opening means, and ingredients inside fall into the pot by gravity through the opening of the package. However, the above arrangement has the following drawbacks: Firstly, only by gravity, the ingredients are hardly emptied out. Furthermore, this rotational feeding manner requires a complicated structure, and it is difficult to manufacture, assemble, clean the multiple parts of the structure and it is difficult to fix the package. Secondly, because its opening means is provided at the lower end of the package fixing means, the ingredients in the package may easily spill onto the opening means and stain the opening means. In addition, the package fixing means shall be desirably arranged at the position very close to the cooking pot, otherwise the ingredients would splash about. Thirdly, since the desired position on which the ingredients should fall is somewhere near the center of the pot covered with oil, if the ingredients fall onto somewhere without oil or with very little oil, such as on the periphery of the pot, those ingredients would stick to the pot, and they would be out of the reach of the stirring means. Furthermore, with this arrangement, the surrounding area of the pot is very crowded and it would not be easy to clean these components.

SUMMARY OF THE INVENTION

It is therefore one of the primary objectives of the present invention to provide a feeding method for feeding cooking ingredients, in which the cooking ingredients are contained in an ingredient bag, and the cooking ingredients in the ingredient bag are completely, accurately and automatically put into a cooking pot.

The present invention provides a method for feeding cooking ingredients, wherein the ingredients contained in an ingredient bag are put into a cooking pot under the control of a control system. The method comprises the steps of:

a. arranging a clamping station at a position within the vicinity of the pot mouth but out of the pot mouth area for clamping the ingredient bag at the clamping station in an automatic or semi-automatic manner or for clamping the ingredient bag by a bag clamping means;

b. limiting the ingredient bag in such a way that the ingredient bag maintains a desirable state when being clamped and is prevented from being deformed during the feeding process;

c. turning over and/or toppling the ingredient bag for inputting the ingredients in the ingredient bag into the pot at a position in the vicinity of the pot mouth;

d. moving the ingredient bag away from the pot mouth area and releasing the ingredient bag from being clamped after the ingredients are fed.

The method of the present invention may arrange a feeding station between the clamping station and the pot at a position in the vicinity of the pot mouth, in which prior to or at the same time of the clamped ingredient bag being turned-over and/or toppled, the ingredient bag is conveyed from the clamping station to the feeding station.

Before the ingredient bag is clamped, the method of the present invention also comprises the steps of fixing the ingredient bag and conveying the ingredient bag to the clamping station, and the conveyance can be done by means of translational displacement or rotation.

Particularly, limiting of the ingredient bag includes limiting the state of the ingredient bag when it is in a static state or being conveyed and/or limiting the state of the ingredient bag when it is being turned-over and/or toppled.

Further, limiting of the ingredient bag includes limiting the ingredient bag on the moving direction of the ingredient bag and/or on the direction which is opposite to the moving direction of the ingredient bag and/or on the direction perpendicular to the moving direction of the ingredient bag.

Alternatively, limiting of the ingredient bag is applied in such a way that the opening of the ingredient bag remains substantially perpendicular to the moving route of the ingredient bag.

The present invention further comprises the step of vibrating and/or striking the ingredient bag in such a way that the cooking ingredients inside the ingredient bag mix uniformly within the ingredient bag and/or the ingredients are separated from the ingredient bag.

Particularly, the vibrating or striking is applied to the middle or lower part of the ingredient bag, or the striking is applied in a direction vertical or oblique to the opening of the ingredient bag.

Alternatively, before the ingredients inside the ingredient bag are turned-over and/or toppled and/or when they are being turned-over and/or toppled, the ingredient bag is enabled to vibrate, to move back and forth or to shake back and forth, so that the ingredients inside the ingredient bag mix uniformly within the ingredient bag and/or the ingredients are separated from the ingredient bag.

The method further comprises the step of: compressing the ingredient bag in such a way that the cooking ingredients within the ingredient bag separate with the ingredient bag.

Particularly, the compressing of the ingredient bag comprises unidirectional or bidirectional compressing the ingredient bag, pressing or clamping the ingredient bag tightly and push-pressing or rolling over the ingredient bag towards its opening and winding the ingredient bag to squeeze out the cooking ingredients in the ingredient bag.

The method of the present invention further comprises the sub-step of opening the ingredient bag before the ingredient bag is turned-over and/or toppled.

Particularly, the position of opening the ingredient bag is at the upper part, the opposite or lateral side of the clamped position of the ingredient bag.

After the ingredients in the ingredient bag are input into the cooking pot, the method further comprises the step of: recycling the ingredient bag which has completed the process of feeding.

The present invention also provides a feeding system based on the above-described feeding method. The feeding system is provided for inputting cooking ingredients in at least one of the ingredient bags into a cooking pot by means of an automatic control system and a cooking execution system. The feeding system comprises an ingredient feeding device which, controlled by the automatic control system, clamps the ingredient bag containing the ingredients at the clamping station, limits the clamped bag, turns over and/or topples the ingredient bag to pour the ingredients inside the ingredient bag into the cooking pot, and then removes the empty bag from the pot mouth area.

The feeding device may comprise different structures comprising different components, e.g. means for clamping or/and conveying, toppling or turning-over etc.

The above feeding system further includes a compressing mechanism, a bag conveying means, a shaking means, a bag opening means and a bag recycling means.

The feeding method of the present invention is able to achieve automatic cooking and processing, using bags to contain cooking ingredients. The feeding device based on the feeding method of the present invention integrates the means for clamping, conveying, toppling or turning-over, and is capable of automatically completing the feeding process by clamping, conveying and toppling/turning-over the ingredient bag. By arranging different working stations, each mechanism of the device can be separately arranged and reasonable layouts can be given to suit actual needs, so that the clamped bag can be accurately moved to reach the desired feeding position by successively conducting certain predetermined movements, so as to avoid the mutual interference of the complicated structures surrounding the cooking pot, and to provide operating space for the stir-fry of cooking ingredients in the pot, to provide some room for the movement of the pot, and to ensure that the ingredients do not spill and/or outflow from the ingredient bag when it is being clamped and conveyed and that the opening of the ingredient bag may be restored to face upward after the feeding, effectively preventing the residuals from staining the surrounding area of the system. In the meantime, the feeding device itself is not inclined to get stained easily, therefore effectively avoiding the feeding device from contaminating the dish. This feeding device is particularly desirable in a cooking environment which is difficult to clean, providing a convenient, swift and simplified cooking process.

The present invention uses bags to hold ingredients, and compared with the use of cartridges, the present invention is cost-effective, and is able to achieve the automatic production, packaging and conveyance of ingredients, and at the same time, without a complicated tearing mechanism, the system of the present invention further saves design cost and production cost. In the feeding process, the ingredients inside the ingredient bag are completely emptied out by turning-over, compressing and shaking the ingredient bag.

BRIEF DESCRIPTION OF THE DRAWINGS

FIG. 40 is a perspective view showing the combination of embodiment 7 of the compressing mechanism with embodiment 3 of the clamping-inverting feeding mechanism in the feeding system of the present invention;

FIG. 41 is a front view showing the structure of embodiment 7 of the compressing mechanism in the feeding system of the present invention;

FIG. 42 is a front view showing the structure of embodiment 8 of the compressing mechanism in the feeding system of the present invention;

FIG. 43 is a perspective view showing the structure of embodiment 1 of the shaking means in the feeding system of the present invention;

FIG. 44 is a front view showing the structure of embodiment 1 of the shaking means in the feeding system of the present invention;

FIG. 45 is a side view showing the structure of embodiment 1 of the shaking means in the feeding system of the present invention;

DETAILED DESCRIPTION OF THE INVENTION

Figure 1:
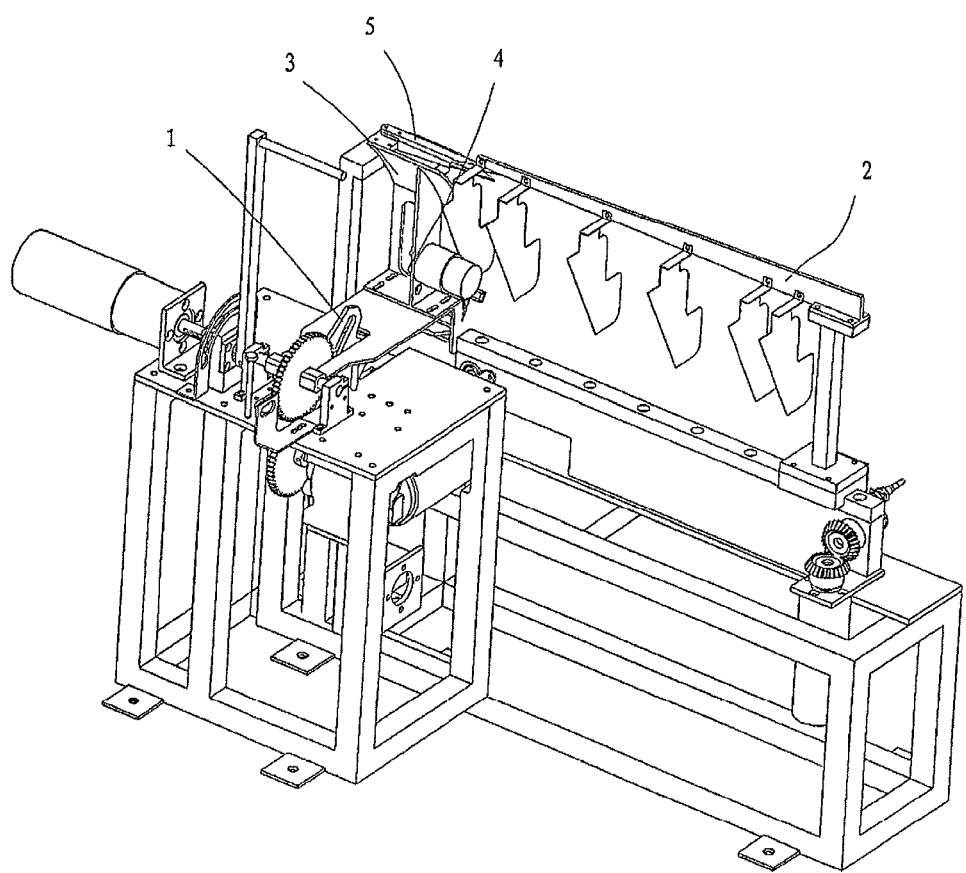
FIG. 1 is a schematic structural view of the feeding system of the present invention.

The present invention will be described in more detail in conjunction with the appended drawings and the embodiments of the present invention so that the objectives, the solutions and the advantages of the present invention will be more clearly understood. It should be understood, however, that the specific embodiments described herein are merely to illustrate the invention and are not intended to limit the present invention.

Firstly, the present invention provides a method for feeding cooking ingredients, which are held in an ingredient bag. The opening of the ingredient bag may be heat sealed, or sealed by an easy open end. Under the control of the control system, the cooking ingredients contained in the ingredient bag are put into an cooking pot, the method comprising the steps of:

a. arranging a clamping station at a position within the vicinity of the pot mouth but out of the pot mouth area for clamping the ingredient bag and preventing the ingredients from spilling out; the ingredient bag may be clamped in an automatic or semi-automatic manner at the clamping station or be clamped by a bag clamping means;

b. limiting the ingredient bag in such a way that the ingredient bag maintains a desirable state when being clamped, to prevent the bag from being deformed to hamper the ingredients in the bag from being poured out smoothly, and/or prevent leakage of the ingredients due to the deformation of the bag, to prevent the ingredients from being poured into an incorrect position, and to prevent possible smudges to the surrounding means and apparatus;

c. turning over and/or toppling the ingredient bag for inputting the ingredients in the ingredient bag into the cooking pot at a position in the vicinity of the pot mouth; and d. after the ingredients are fed, moving the ingredient bag away from the pot mouth area and releasing the ingredient bag from being clamped.

Further, the method of the present invention may arrange a feeding station between the clamping station and the pot at a position in the vicinity of the pot mouth, wherein before the clamped ingredient bag is conveyed, turned-over and/or toppled, the bag is conveyed from the clamping station to the feeding station. Such an arrangement provides room for the layout of the entire feeding device, and on the other hand, facilitates opening the sealed ingredient bag.

The method of the present invention also comprises a step of fixing the ingredient bag and conveying the bag to the clamping station before the bag is clamped. Prior to the actually cooking, different cooking ingredients are divided and put into different ingredient bags, and the sealed ingredient bags are conveyed to the above mentioned clamping station for further processing. The conveying can be done by translational displacement, rotation or inverting.

Particularly, limiting of the bag includes limiting the state of the bag when it is in a static state or being conveyed and/or limiting the state of the bag when it is being turned-over and/or toppled. Limiting of the bag also includes limiting the ingredient bag on the moving direction of the ingredient bag and/or on the direction opposite to the moving direction of the ingredient bag and/or the on the direction perpendicular to the moving direction of the ingredient bag.

The limiting of the ingredient bag is applied in such a way that the opening of the bag remains substantially perpendicular to the moving route of the bag.

Further, after the bag is clamped, the method further comprises the step of: vibrating and/or striking the bag in such a way that the cooking ingredients inside the bag are sufficiently and evenly mixed and/or the cooking ingredients inside the bag are separated from the bag. Due to differences in the composition and nature of different cooking ingredients, and due to their interaction with the bag, some ingredients can automatically separate from the bag and fall into the cooking pot under gravity, but some ingredients cannot or cannot be easily or completely separated from the bag, and in those cases, the aid of external forces such as vibration and/or strike is needed to prompt the ingredients to be separated from the bag. Generally speaking, due to gravity, the ingredients typically accumulate in the lower half of the bag. Thus, before the bag is clamped or after the bag is clamped, vibrating or striking may be applied to the middle part or the lower half of the bag, to the bottom or to the vicinity of the bottom of the bag or to the vicinity of the clamped position. The striking may be applied in a direction perpendicular to the plane of the bag or in a direction oblique to opening of the bag. For starch ingredients, by way of vibration or striking, the starch deposition can be mixed evenly with the water, thereby ensuring the quality of dressing the dish with starchy sauce, which is a common step in Chinese cooking.

In the case that a feeding station is arranged, the bag can be made to vibrate, move back and forth or shake back and forth after the bag is clamped and before the ingredients inside the bag are turned-over and/or toppled, and/or during the process of their being turned-over and/or being toppled, so that the ingredients inside the bag mix uniformly within the bag and/or the ingredients are separated from the bag.

Still further, since some cooking ingredients (e.g. sauces) are viscous to some extent, or some ingredients are prepared in advance with starch ingredients, in order to promote the separation of these ingredients with the bag, the method of the present invention further comprises the step of: compressing the bag from bottom up in the process of turning-over or/and toppling the bag, so that the cooking ingredients inside the bag are substantially or completely put into the cooking pot.

Particularly, the compressing of the ingredient bag comprises unidirectionally or bidirectionally compressing the ingredient bag, pressing the ingredient bag and then push-pressing or rolling over the ingredient bag towards its opening, and winding the bag in such a way that the cooking ingredients in the bag are squeezed out.

The ingredient bag can be directly disposed at the clamping station by means of, e.g. mechanical hand, or the ingredient bag prepared with cooking ingredients is conveyed to the clamping station by means of a conveying mechanism, and thus the method of the present invention further comprises the step of: fixing the ingredient bag and transferring the ingredient bag to the clamping station prior to conveying the ingredient bag to the clamping station.

In any time during the process of fixing the bag and conveying it to the clamping station and before the bag is turned-over and/or toppled, the method of the present invention further comprises the sub-step of: opening the bag to allow the ingredients to be poured out. Particularly, the position for opening the bag is at the upper part, the opposite or lateral side of the clamped position of the bag.

After the ingredients in the bag are put into the cooking pot, the method further comprises the steps of: moving the ingredient bag away from the pot mouth area to the clamping station and releasing the ingredient bag from being clamped, and at the same time, recycling the ingredient bag.

Based on the above method, the present invention provides a feeding system. As shown in FIG. 1, the feeding system comprises a feeding device 1. The bag for feeding the ingredients into the pot may be arranged at a clamping station and is clamped at the clamping station, and then is conveyed to a feeding station. The feeding device thus fulfils the functions of bag clamping, conveying, toppling or turning-over for feeding ingredients into the cooking pot. The feeding system of the present invention may also be provided with a bag conveying means 2 and a compressing mechanism 3. The bag conveying means 2 is used to fix each ingredient bag before the bag is conveyed to the clamping station, and then convey the bag to the clamping station. The compressing mechanism 3 is disposed at the feeding station, and can be used to make one more compression to the bag when the bag is being turned-over or/and toppled and before the bag is turned-over again and reset to the feeding station, so that ingredients inside the bag can be completely fed into the cooking pot. In addition, the present invention further comprises a bag opening means 5 or a bag cutting means arranged on the bag conveying path to the clamping station, to automatically open the seal of the bag, prompting the feeding of the ingredients after the bag is turned-over at the feeding station. After the completion of the feeding process, the empty bag can be recycled by a bag recycling means 6.

The detailed structures of the various components of the feeding system in the present invention will be described below in detail in conjunction with the embodiments and the accompanying drawings.

FIGS. 2-26, 36-39 are the various embodiments of the feeding device 1 in the feeding system according to the present invention.

1. The Clamping, Conveying and Toppling Mechanism of the Feeding Device 1:

The clamping, conveying and toppling mechanism of the present embodiment is an example of the combination of various mechanisms of the feeding device 1, comprising: a bag clamping means for automatically clamping the ingredient bag containing cooking ingredients and for limiting the state of the bag when it is being clamped, an inter-station conveying means which can automatically move the bag being clamped by the clamping means between the clamping station and the feeding station, and an ingredient toppling means for automatically pouring ingredients inside the bag into the cooking pot.

The bag clamping means comprises a bag clamp for clamping the bag, a clamping driver and a clamping route converter. The bag clamp is disposed at the clamping station for clamping or releasing the ingredient bag. The clamping route converter is disposed between the bag clamp and the clamping driver and is provided for converting the torque outputted by the clamping driver into the clamping torque of the clamp, and also for outputting a release torque to release the bag after the ingredients in the bag are toppled and emptied out.

Referring now to FIGS. 2-5, the structures of the clamping, conveying and toppling means of the feeding device 1 of the present invention are as follows: The bag clamp comprises a first fixed clamp 1110 and a first rotational clamp 1120. The first fixed clamp 1110 includes a lath-shaped first clamping arm 1113, one end of the first clamping arm 1113 having an axle sleeve 1112 integrally molded therewith; within the axle sleeve 1112 is inserted with a first clamping pin 1144. On the plane of the first clamping arm 1113, a first fixed clamping plate 1111, which is disposed at one end of the axle sleeve 1112, extends vertically upwards. The first rotational clamp 1120 includes a first rotational clamping plate 1121 which is arranged at a position opposing the first fixed clamping plate 1111. The first clamping pin 1144 is sheathed by the first rotational clamping plate 1121, which can be driven to rotate by the first clamping pin 1144. The first fixed clamping plate 1111 and the first rotational clamping plate 1121 are provided so that the bag can be clamped, and in additional, since the first fixed clamping plate 1111 and the first rotational clamping plate 1121 have their heights and widths, the bag can be limited during the clamping process and during subsequent processes (before the release of the clamping). Furthermore, first clamping heads 1114 and 1124 are respectively provided on the first fixed clamping plate 1111 and on the first rotational clamping plate 1121, at opposing positions on the two clamping plates. When the first rotational clamping plate 1121 is displaced towards the first fixed clamping plate 1111 to the maximum degree, the two first clamping heads 1114 and 1124 clamp against each other. The two first clamping heads 1114 and 1124 can be made of flexible or elastic materials to avoid damaging the ingredient bag 9 when clamping the bag 9 and to provide a large surface friction with the ingredient bag 9 to prevent the ingredient bag 9 from slipping when being clamped.

The clamping driver is a clamping drive motor 1130. The clamping route converter comprises a first driving pulley 1141 which is connected to the output shaft of the clamping drive motor 1130, a first driven pulley 1142 and a first driving belt 1143 which connects the first driving pulley 1141 to the first driven pulley 1142 and which transfers the driving force. Particularly, the clamping drive motor 1130 is fixedly mounted on the first clamping arm 1113. The first driving pulley 1141 is connected to an output shaft of the clamp drive motor 1130. The first driven pulley 1142 is disposed at one side of the first rotational clamping plate 1121 and is fixedly connected to the first clamping pin 1144. The first rotational clamping plate 1121 rotates along with the first driven pulley 1142 by means of the first clamping pin 1144. In this way, by means of the first clamping pin 1144 which is inserted into the first sleeve 1112, the first rotational clamping plate 1121 is rotatably connected to the first clamping arm 1113.

In the run mode, the clamping drive motor 1130 starts forward rotation to drive the first driving pulley 1141 to rotate, and further actuates the first driven pulley 1142 to rotate through the first driving belt 1143, forming a clamping torque, so that the first rotational clamping plate 1121 displaces towards the first fixed clamping plate 1111 to clamp the ingredient bag 9 disposed between the two clamping plates. Conversely, the clamping drive motor 1130 starts reverse rotation to drive the first driven pulley 1142 to rotate, forming a release torque and causing the first rotational clamping plate 1121 to move away from the first fixed clamping plate 1111, thereby releasing the ingredient bag 9.

The inter-station conveying means is used for moving the ingredient bag 9 at the clamping station to the feeding station, comprising an inter-station conveying driver and an inter-station conveying route converter; wherein the inter-station conveying driver is a conveying drive motor 1150; the inter-station conveying route converter is disposed between the bag clamping means and the inter-station conveying driver, i.e. between the bag clamp and the conveying drive motor 1150, used for converting the torque outputted by the conveying drive motor 1150, i.e. the inter-station conveying driver, into a torque for driving the bag clamping means to move between the clamping station and the feeding station.

Particularly, the inter-station conveying route converter comprises a second driving pulley 1161 which is connected to the conveying drive motor 1150, a second driven pulley 1162, and a second driving belt 1163 which connects the second driving pulley 1161 to the driven pulley 1162 and which transmits the driving force, a first screw rod 1164, and a first guide rod 1165. The second driving pulley 1161 is connected to the output shaft of the conveying drive motor 1150. The second driven pulley 1162 is connected to the first screw rod 1164 and can drive the first screw rod 1164 to rotate. The first screw rod 1164 is in parallel arrangement with the first guide rod 1165; and at the two ends of the first screw rod 1164 and the first guide rod 1165, there are respectively fixedly provided with a first front end bracket 1166 and a first tail end bracket 1167, wherein the first front end bracket 1166 and the first tail end bracket 1167 are respectively provided with threaded holes which can serve to screw both ends of the first screw rod 1164, and at the same time, the first front end bracket 1166 and the first tail end bracket 1167 are provided with parallel through holes; the two ends of the first guide rod 1165 are respectively inserted into the two through holes to be fixedly connected to the first front end bracket and the first tail end bracket.

The inter-station conveying means further comprises a conveying supporting means disposed between the bag clamping means and the inter-station conveying route converter. The conveying supporting means is a translational slide block 1171. The bottom of the translational slide block 1171 is sheathed by the first screw rod 1164 and the first guide rod 1165, and is rotatably connected therewith. The upper end of the translational slide block 1171 is connected to the other end of the first clamping arm 1113. When the conveying drive motor 1150 is conducting forward rotation, the first screw rod 1164 is driven to rotate through the second driven pulley 1162, thereby causing the translational slide block 1171 to slide on the first guide rod 1165; the first guide rod 1165 moves from the clamping station to the feeding station, thereby allowing the ingredient bag 9 which is disposed at one end of the first clamping arm 1113 and which is clamped between the first fixed clamp 1110 and the first rotational clamp 1120 to move to the feeding station. When the conveying drive motor 1150 is having a reverse rotation, the first screw rod 1164 is actuated to likewise conduct a reverse rotation, causing the translational slide block 1171 to return from the feeding station to the clamping station, thereby driving the first fixed clamp 1110 and the first rotational clamp 1120 as well as the emptied ingredient bag 9 clamped between the two clamps to return to the clamping station. The ingredient toppling means comprises a toppling driver and a toppling route converter; the toppling route converter is disposed between the bag clamping means and the toppling driver, and the toppling route converter is used for converting the torque which is outputted by the toppling driver into a toppling torque for driving the bag clamping means or the inter-station conveying means which is connected to the bag clamping means to topple the ingredient bag at the feeding station, or into a returning torque for allowing the bag clamping means or the inter-station conveying means which is connected to the bag clamping means to reset to a state before toppling.

Figure 2:
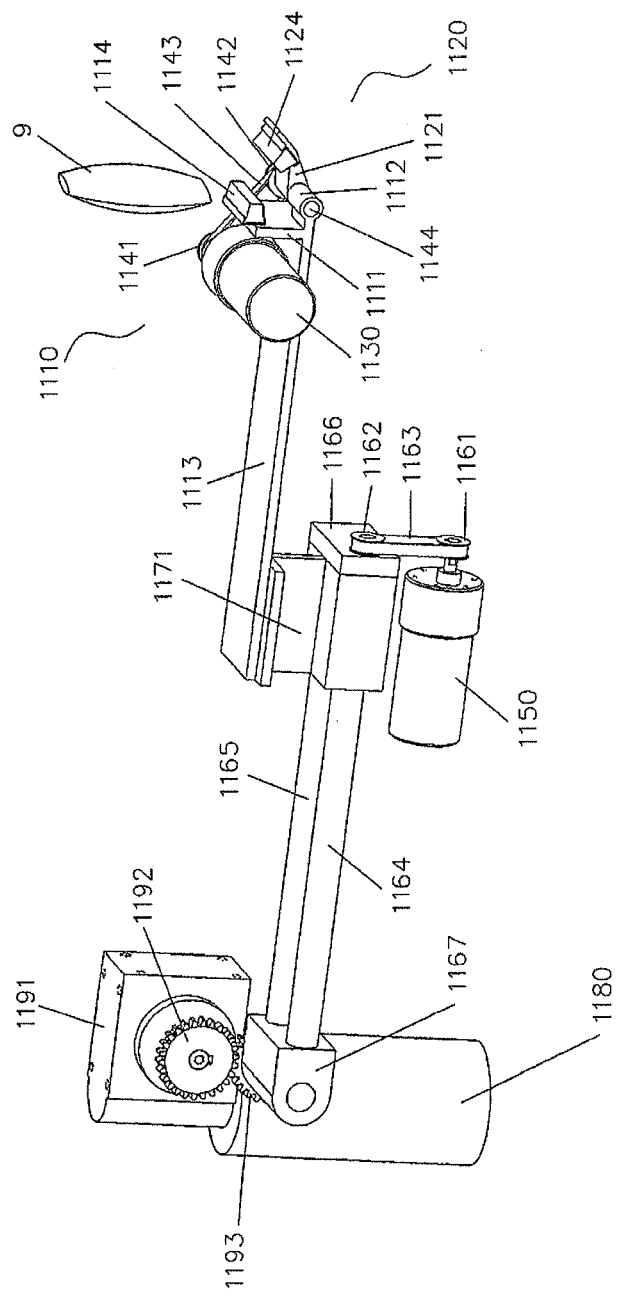
FIG. 2 is a perspective view showing the structure of the clamping, conveying and toppling mechanism in an embodiment of the feeding device of the feeding system according to the present invention.
Figure 3:
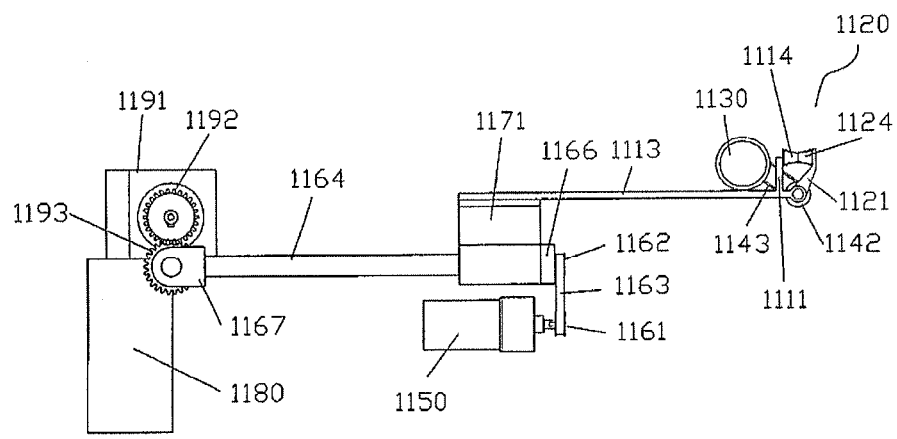
FIG. 3 is a view showing the conveying state of the clamping, conveying and toppling mechanism in one embodiment of the feeding device of the feeding system according to the present invention.
Figure 4:
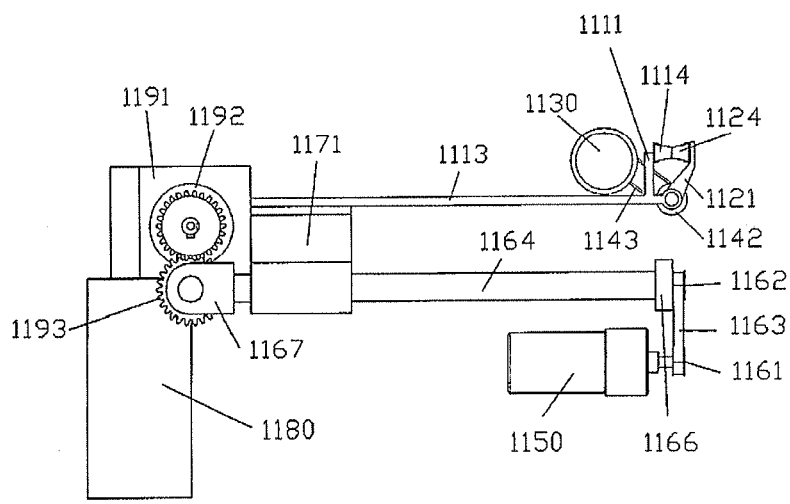
FIG. 4 is another view showing the conveying state of the clamping, conveying and toppling mechanism in the embodiment of the feeding device of the feeding system according to the present invention.
Figure 5:
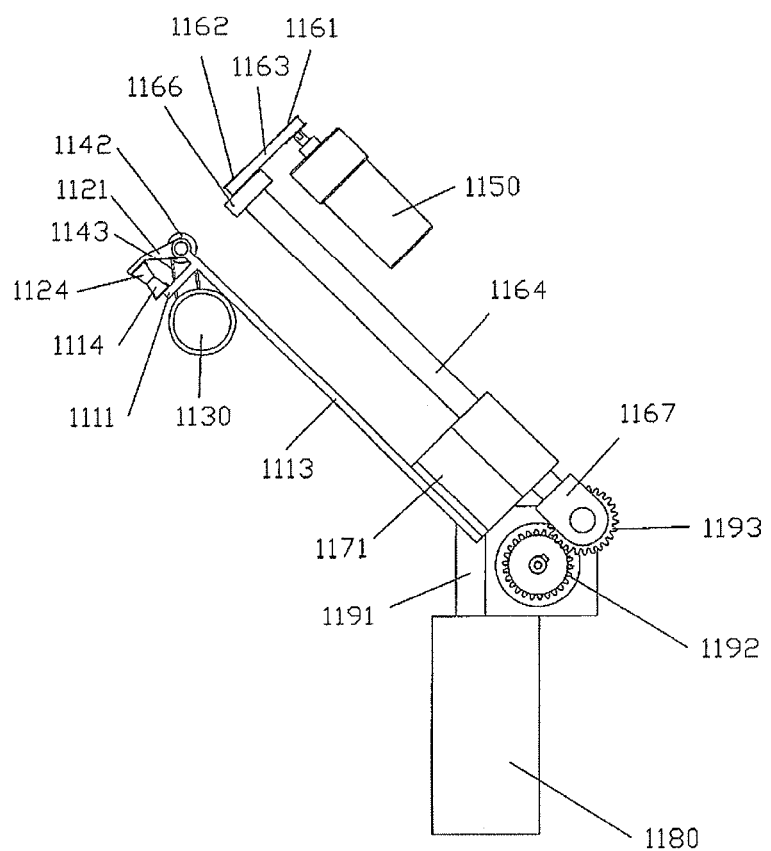
FIG. 5 is a view showing the toppled state of the clamping, conveying and toppling mechanism in the embodiment of the feeding device of the feeding system according to the present invention.
Figure 6:
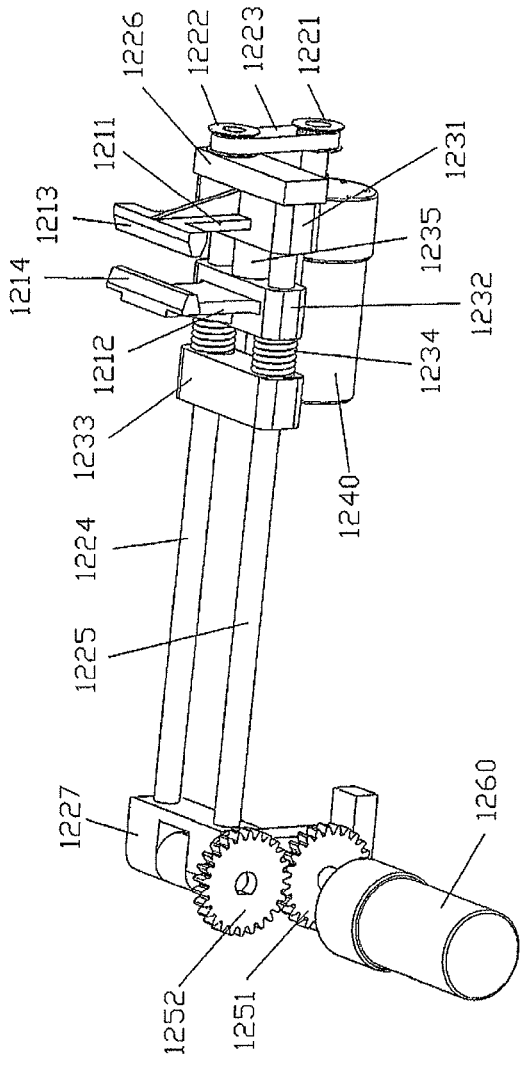
FIG. 6 is a perspective view showing the structure of the clamping-conveying and toppling mechanism in an embodiment of the feeding device of the feeding system according to the present invention.
Figure 7:
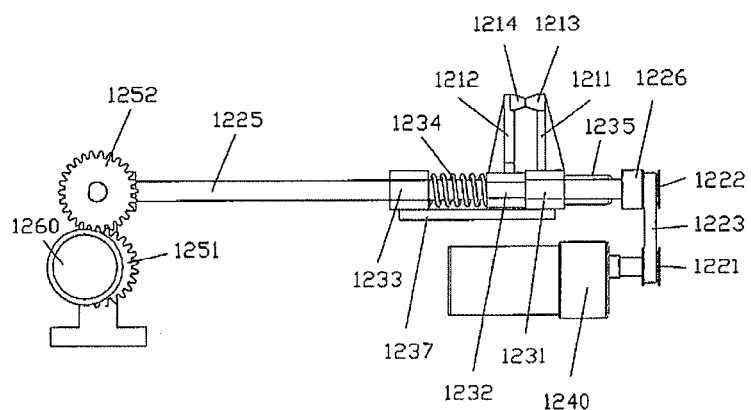
FIG. 7 is a view showing the conveying state of the clamping-conveying and toppling mechanism in the embodiment of the feeding device of the feeding system according to the present invention.
Figure 8:
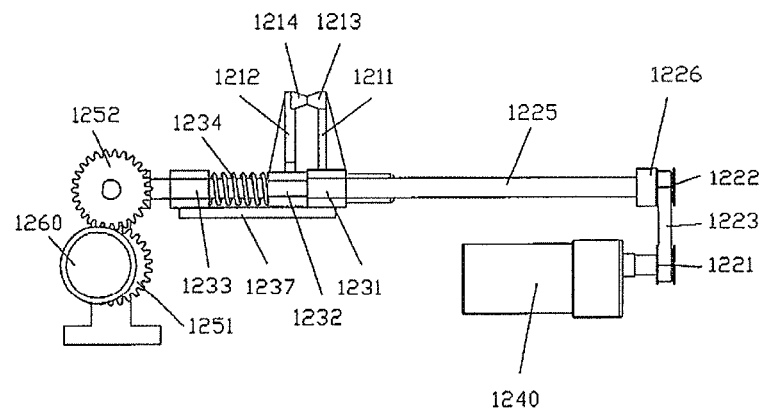
FIG. 8 is another view showing the conveying state of the clamping-conveying and toppling mechanism in the embodiment of the feeding device of the feeding system according to the present invention.
Figure 9:
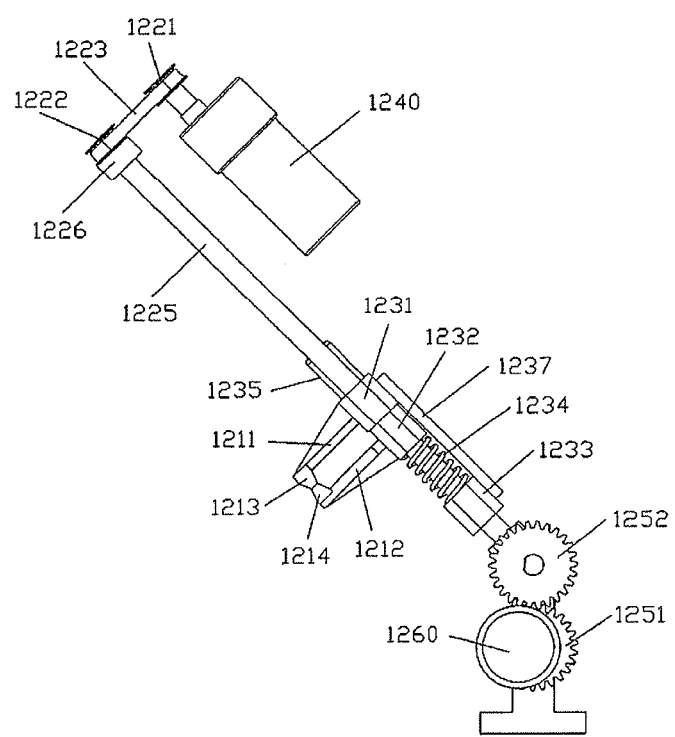
FIG. 9 is a view showing the toppled state of the clamping-conveying and toppling mechanism in the embodiment of the feeding device of the feeding system according to the present invention.
Figure 10:
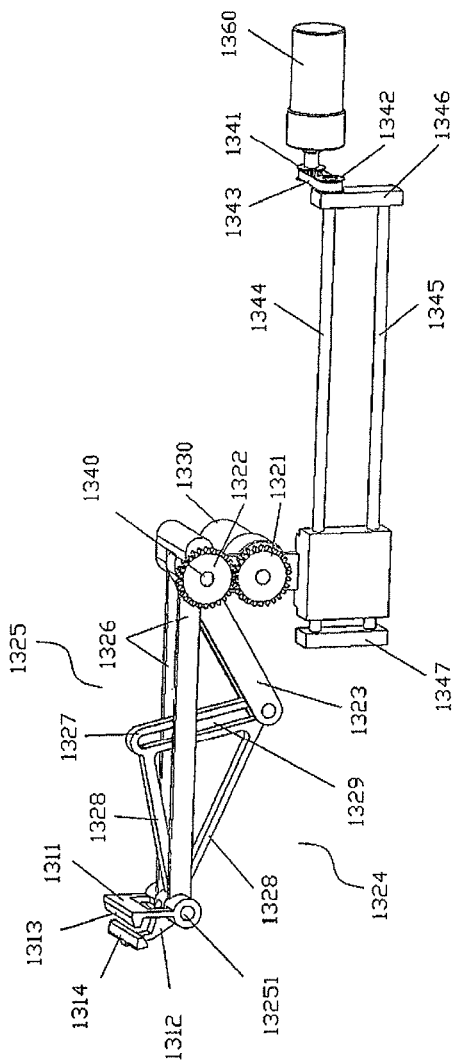
FIG. 10 is a perspective view showing the structure of the clamping-toppling and conveying mechanism in an embodiment of the feeding device of the feeding system according to the present invention.
Figure 11:
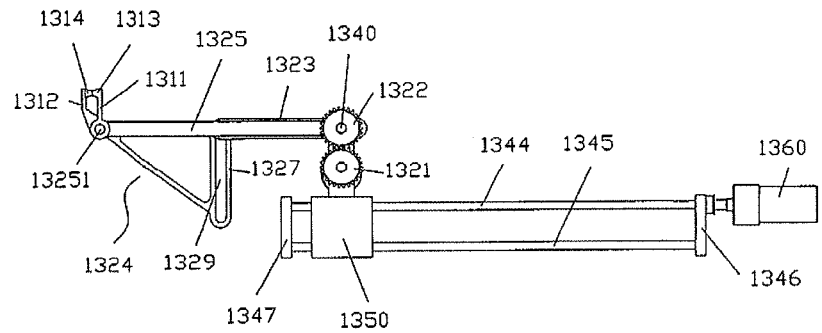
FIG. 11 is a view showing the conveying state of the clamping-toppling and conveying mechanism in the embodiment of the feeding device of the feeding system according to the present invention.
Figure 12:
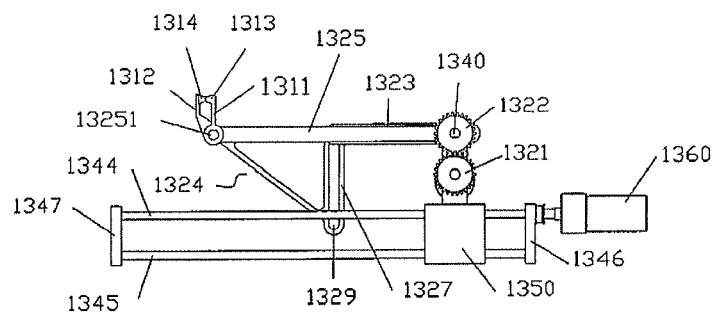
FIG. 12 is another view showing the conveying state of the clamping-toppling and conveying mechanism in the embodiment of the feeding device of the feeding system according to the present invention.
Figure 13:
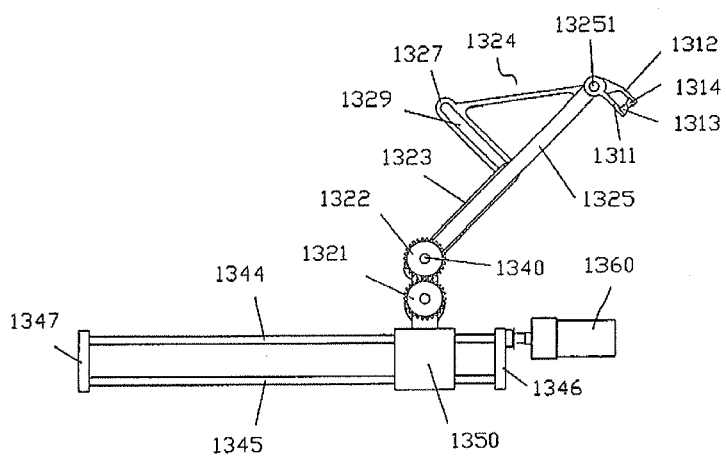
FIG. 13 is a view showing the toppled state of the clamping-toppling and conveying mechanism in the embodiment of the feeding device of the feeding system according to the present invention.
Figure 14:
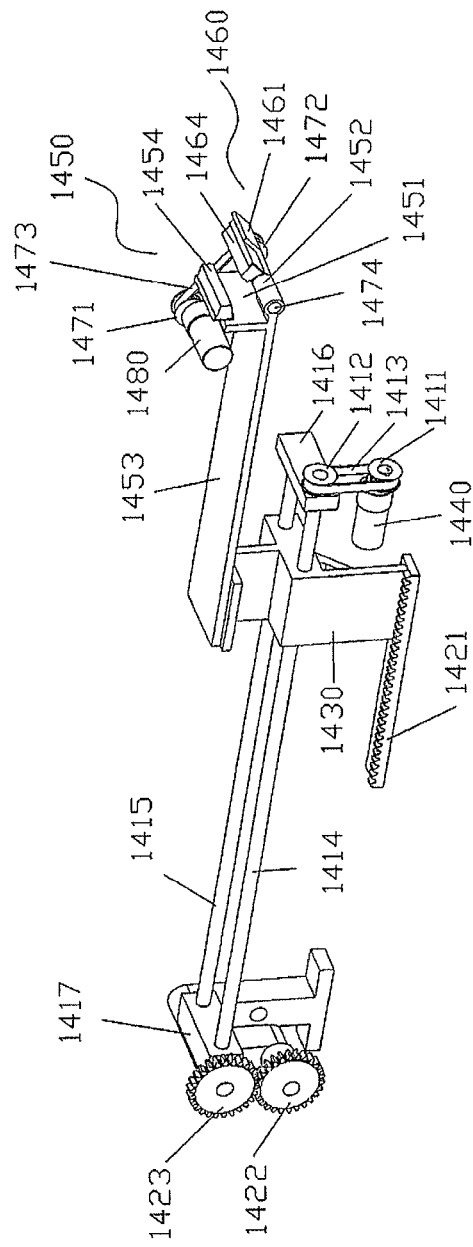
FIG. 14 is a perspective view showing the structure of the clamping and conveying-toppling mechanism in an embodiment of the feeding device of the feeding system according to the present invention.
Figure 15:
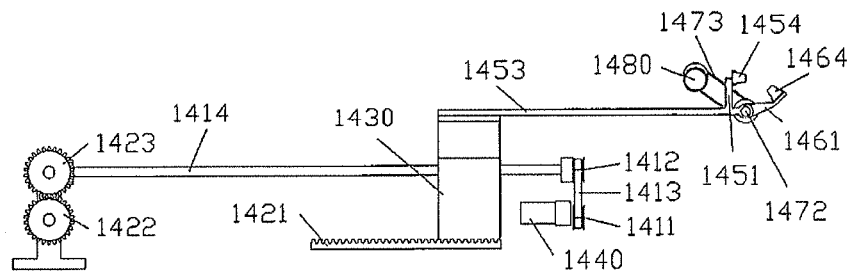
FIG. 15 is a view showing the conveying state of the clamping and conveying-toppling mechanism in the embodiment of the feeding device of the feeding system according to the present invention.
Figure 16:
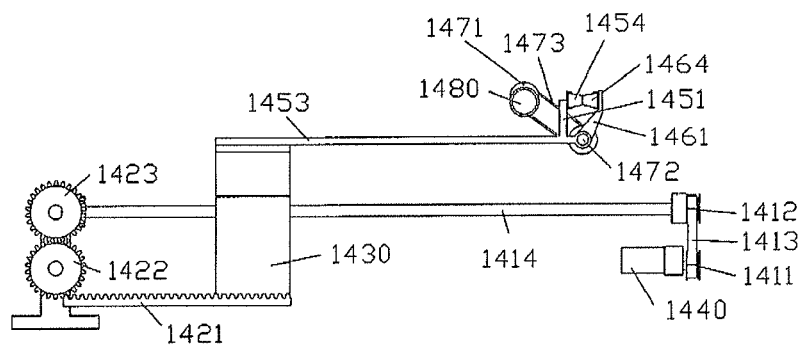
FIG. 16 is another view showing the conveying state of the clamping and conveying-toppling mechanism in the embodiment of the feeding device of the feeding system according to the present invention.
Figure 17:
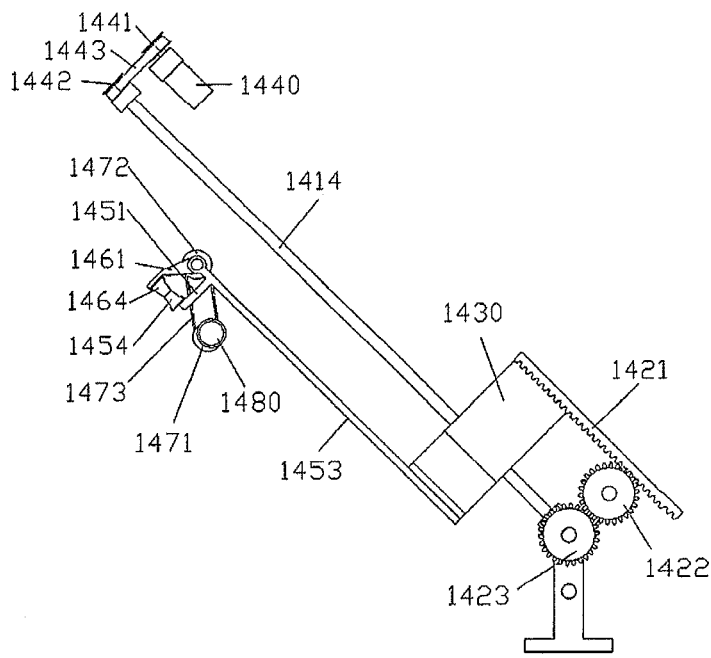
FIG. 17 is a view showing the toppled state of the clamping and conveying-toppling mechanism in the embodiment of the feeding device of the feeding system according to the present invention.

Particularly, the toppling driver is a first toppling drive motor 1180. The toppling route converter comprises a reduction gear box 1191, a first driving gear 1192 and a first driven gear 1193 which are in mutual engagement. The output shaft of the toppling drive motor 1180 is connected to the first-stage gear of the reduction gear box 1191, while the output shaft of the last stage gear of the reduction gear box 1191 is connected to the first driving gear 1192. The first driven gear 1193 is rotatably connected to the bag clamping means, or is rotatably connected to the inter-station conveying means of the bag clamping means. FIGS. 2-4 show that the first driven gear 1193 is fixedly connected to the first tail end bracket 1167 through a revolving shaft. The forward rotation of the toppling drive motor 1180 drives the first driven gear 1193 to rotate and transmit toppling torque, thereby driving the first tail end bracket 1167 to rotate, i.e. causing the bag clamping means or the inter-station conveying means which is connected to the bag clamping means to topple the bag (see FIG. 5). On the other hand, the reverse rotation of the toppling drive motor 1180 causes the first driven gear 1193 to rotate and transmit returning torque, causing the bag clamping means or the inter-station conveying means connected to the bag clamping means to return to a state before toppling—being horizontally arranged.

2. The Clamping-Conveying and Toppling Mechanism of the Feeding Device 1:

The clamping-conveying and toppling mechanism in this example is another embodiment of the various combinations of the feeding device 1, comprising a clamping-conveying means which can clamp the bag containing cooking ingredients and limit the state of the clamped bag and can automatically move the clamped bag between the clamping station and the feeding station, and an ingredient toppling means used for automatically pouring ingredients inside the bag into the cooking pot.

The clamping-conveying means comprises a clamp, a clamping-conveying driver and a clamping-conveying route converter. The clamp is used to clamp or release the bag. The clamping-conveying route converter is disposed between the clamp and the clamping-conveying driver, and is used for converting the torque outputted by the clamping-conveying driver into a clamping torque for allowing the clamp to clamp the bag and into a releasing torque for releasing the clamping of the bag, and is also used for converting the torque outputted by the clamping-conveying driver into a torque for driving the clamp which is clamping the bag to move between the clamping station and the feeding station.

Referring now to FIGS. 6-9, the clamp comprises an initiative clamping plate 1211 and a follower clamping plate 1212, the two being arranged at opposing positions. The initiative plate 1211 is vertically and fixedly arranged on a first driving translational slide block 1231 and can be integrally formed therewith. The follower clamping plate 1212 is vertically and fixedly arranged on a first driven slide block 1232 and can be integrally formed therewith. The first driving translational slide block 1231 and the first driven slide block 1232 are both sheathed by the third guide rod 1225 and the third screw rod 1224, which are in parallel arrangement. The two ends of the third guide rod 1225 and the third screw rod 1224 are respectively connected to the third front end bracket 1226 and the third tail end bracket 1227, i.e. the third guide rod 1225 and the third screw rod 1224 are disposed between the third front end bracket 1226 and the third tail end bracket 1227. The first driving translational slide block 1231 and the first driven slide block 1232 are respectively provided with threaded holes and through holes. The third screw rod 1224 is screwed to threaded holes which are provided on the first driving translational slide block 1231 and the first driven slide block 1232, and both ends of the third screw rod 1224 are rotatably connected to the third front end bracket 1226 and the third tail end bracket 1227. The third guide rod 1225 passes through the through holes which are provided on the first driving translational slide block 1231 and the first driven slide block 1232, and the two ends of the third guide rod 1225 are sheathed by the third front end bracket 1226 and the third tail end bracket 1227. The first driving translational slide block 1231 is arranged in the vicinity of the third front end bracket 1226, while the first driven slide block 1232 can freely slide along the axes of the third guide rod 1225 and the third screw rod 1224. A gap is arranged between the first driving translational slide block 1231 and the first driven slide block 1232. When the first driving translational slide block 1231 moves to adjoin the first driven slide block 1232, the ingredient bag 9 at the clamping station is successfully clamped. When the first driving translational slide block 1231 continues to move, the first driven slide block 1232 moves with the first driving translational slide block 1231, thereby conveying the ingredient bag 9 from the clamping station to the feeding station. When the first driving translational slide block 1231 resets, the first driven slide block 1232 also resets, allowing the ingredient bag 9 to return from the feeding station to the clamping station and to be released from being clamped. Similarly, by arranging the above-described initiative clamping plate 1211 and follower clamping plate 1212, the bag is clamped, and since the clamping plates have certain widths and heights, the bag is limited in the clamping process and in subsequent processes (before the release of the clamping).

Further, on the initiative clamping plate 1211 and the follower clamping plate 1212, and at opposing positions on the two clamping plates, there are provided with second clamping heads 1214, 1213. When the follower clamping plate 1212 approaches the initiative clamping plate 1211, the two second clamping heads 1214, 1213 clamp against each other. The two first clamping heads 1214 and 1213 can be made of flexible or elastic materials, to avoid damaging the ingredient bag 9 when it is being clamped, and on the other hand to provide a large surface friction to the ingredient bag 9 to prevent the ingredient bag 9 from slipping when being clamped.

To further improve the reliability of the clamping, a second driving translational sliding block 1233 is slidably arranged on the third guide rod 1225 and the third screw rod 1224. That is to say, the first driving translational sliding block 1231, the first driven slide block 1232 as well as the second driving translational slide block 1233 are all sleeved in parallel to the third guide rod 1225 and the third screw rod 1224 by means of their respective through holes or threaded holes. In addition, the first driven slide block 1232 is disposed between the first driving translational slide block 1231 and the second driving translational slide block 1233. The first driving translational slide block 1231 and the second driving translational slide block 1233 are fixedly connected through a connecting plate 1237. That is to say, the distance between the first driving translational slide block 1231 and the second driving translational slide block 1233 is constant, while the first driven slide block 1232 has a variable distance with the first driving translational slide block 1231 and the second driving translational slide block 1233. In the meantime, two springs 1234 are respectively sheathed by the third screw rod 1224 and the third guide rod 1225. The two springs 1234 are arranged between the second driving translational slide block 1233 and the first driven slide block 1232, and are used for ensuring that the first driven slide block 1232 remains close to the first driving translational slide block 1231 when the first driven slide block 1232 is moving with the first driving translational slide block 1231, so as to maintain clamping stability and to avoid reduced clamping force due to factors such as vibrations and so on.

Between the first driven slide block 1232 and the first driving translational slide block 1231, there is also provided with a carrier rod 1235 which is parallel to the third screw rod 1224 and with the third guide rod 1225. At the same time, the first driving translational slide block 1231 is provided with a through hole for allowing the carrier rod 1235 to pass through. The length of the carrier rod 1235 is greater than the length of the through hole so that the carrier rod 1235 of the first driven slide block 1232 can pass through the first driving translational slide block 1231 to be connected to the third front end bracket 1226.

The clamping-conveying driver is a clamping-conveying drive motor 1240. The clamping-conveying route converter comprises: a third driving pulley 1221 which is connected to the output shaft of the clamping-conveying drive motor 1240, a third driven pulley 1222, and a third driven belt 1223 which connects the third driving pulley 1221 to the third driven pulley 1222. The output shaft of the third driven pulley 1222 is connected to the third screw rod 1224 so that, through the third driven pulley 1222, the clamping-conveying drive motor 1240 transmits force to the third screw rod 1224, thereby driving the first driving translational slide block 1231 to move forth and back along the direction of third guide rod (the first driven sliding block 1232 also follows to move)

When the clamping-conveying means is not clamping the ingredient bag 9, the first driving translational slide block 1231 stops at one side of the third front end bracket 1226, and with the help of the carrier rod 1235 which props against the third front end bracket 1226, there exists a gap between the first driven slide block 1232 and the first driving translational slide block 1231, so that the initiative clamping plate 1211 and the follower clamping plate 1212 do not clamp against each other. When the clamping-conveying drive motor 1240 is conducting forward rotation, the third screw rod 1224 is actuated to likewise conduct forward rotation, so that the first driving translational slide block 1231 and the second driving translational slide block 1233 both translationally moves towards the third tail end bracket 1227. At this time, by means of the spring 1234 and the carrier rod 1235, the first driven sliding block 1232 stays intact while the first driving translational slide block 1231 moves towards the first driven slide block 1232 until the first driving translational slide block 1231 adjoins the first driven slide block 1232, thereby clamping the ingredient bag 9 between the initiative clamping plate 1211 and the follower clamping plate 1212. The third screw rod 1224 continues to maintain forward rotation, while the first driving translational slide block 1231 and the second driving translational slide block 1233 continues to translationally move towards the third tail end bracket 1227. In this process, under the push of the springs 1234 to the first driven slide block 1232, the first driven slide block 1232 abuts the first driving translational slide block 1231 and follows the first driving translational slide block 1231 to translationally move, thereby enabling the initiative clamping plate 1211 and the follower clamping plate 1212 to maintain a translational movement until the second driving translational slide block 1233 adjoins the third tail end bracket 1227, finishing the process of clamping and conveying. Conversely, when the clamping-conveying drive motor 1240 is conducting a reverse rotation, the third screw rod 1224 is caused to likewise have a reverse rotation, and the initiative clamping plate 1211 and the follower clamping plate 1212 maintain the clamping against each other and have a translational movement towards the third front end bracket 1226. When the carrier rod 1235 of the first driven slide block 1232 touches the third front end bracket 1226, the first driven slide block 1232 stops its translational movement. The first driving translational slide block 1231 and the second driving translational slide block 1233 continue to move translationally until the first driving translational slide block 1231 touches the third front end bracket 1226 and the initiative clamping plate 1211 separates from the follower clamping plate 1212, thus completing the process of bag conveying and releasing.

The cooking ingredient toppling means comprises: a toppling driver for causing the ingredient bag 9 to topple and for allowing the clamping-conveying means to turn over, or for allowing the clamping-conveying means to reset after the ingredients are poured, and a toppling route converter. The toppling route converter is disposed between the clamping-conveying means and the toppling driver, for converting the torque outputted by the toppling driver into the toppling torque for driving the clamping-conveying means to pour out ingredients in the bag at the feeding station, and into a returning torque for driving the clamping-conveying means to reset to a state before toppling.

Particularly, the toppling driver is a toppling drive motor 1260. The toppling route converter comprises a third driving gear 1251 and a third driven gear 1252 which are in mutual engagement. The third driving gear 1251 is connected to the output shaft of the toppling drive motor 1260, while the third driven gear 1252 is connected to the third tail end bracket 1227 of the clamping-conveying means, and can transfer the driving force outputted by the toppling drive motor 1260 to the third tail end bracket 1227. When the toppling drive motor 1260 is having forward rotation, the third driving gear 1251 is mobilized. Engaged by the third driven gear 1252, the third tail end bracket 1227 is caused to sway, thereby turning-over the entire clamping-conveying means, causing the ingredient bag 9 to topple; when the toppling drive motor 1260 is having reverse rotation, the clamping-conveying means is turned-over, causing the ingredient bag 9 to reset to the original untoppled state.

3. The Clamping-Toppling and Conveying Mechanism of the Feeding Device 1:

The clamping-toppling and conveying mechanism of the present example is the third embodiment of the combinations of the various mechanisms of the feeding device 1, comprising: a clamping toppling means for clamping the bag and limiting the state of the bag when it is being clamped, and for automatically pouring ingredients inside the bag to the cooking pot; and an inter-station conveying means for moving the bag which is clamped by the clamping toppling means between the clamping station and the feeding station.

Further, the clamping toppling means comprises a clamp, a clamping toppling driver and a clamping toppling route converter. The clamp is used for clamping or releasing the bag; the clamping toppling route converter is disposed between the clamping toppling driver and the clamp, used for converting the torque outputted by the clamping toppling driver when the clamp is at the clamping station into a clamping torque for driving the clamp to grip the bag and a releasing torque for releasing the bag; meanwhile, when the clamp is at the feeding station, the clamping toppling route converter is used for converting the torque outputted by the clamping toppling driver into the toppling torque for driving the gripped bag to topple at the feeding station, and for converting the torque outputted by the clamping toppling driver into the returning torque for driving the gripped bag to reset to a state before toppling.

Referring to FIGS. 10-13, it is seen that the clamp includes a fourth fixed clamping plate 1311 and a fourth rotational clamping plate 1312 which are arranged opposing each other. The fourth fixed clamping plate 1311 and the fourth rotational clamping plate 1312 are arranged so that the bag can be clamped, and on the other hand, since the two plates have certain heights and widths, they help limit the bag in the bag clamping process and in subsequent processes (before the release of the clamping). Similarly, at opposing positions on the fourth fixed clamping plate 1311 and the fourth rotational clamping plate 1312, third clamping heads 1313, 1314 are provided. When the fourth rotational clamping plate 1312 rotates towards the fourth fixed clamping plate 1311 to the maximum degree, the two clamping heads 1313, 1314 clamp straightly against each other.

The clamping toppling driver is a clamping toppling drive motor 1330, and the clamping toppling route converter comprises a fourth driving gear 1321 and a fourth driven gear 1322 which are in mutual engagement, and a fourth toppling rocker arm 1325. The fourth driving gear 1321 is connected to the output shaft of the clamping toppling drive motor 1330. One end of the fourth toppling rocker arm 1325 is fixedly connected to the fourth driven gear 1322. The driving force which is outputted by the clamping toppling drive motor 1330 can be transferred to the fourth toppling rocker arm 1325. The bottoms of the fourth fixed clamping plate 1311 and the fourth rotational clamping plate 1312 are hinged with the other end of the fourth toppling rocker arm 1325 through a hinge axis 13251.

The fourth toppling rocker arm 1325 comprises two parallel rocker arms 1326, a fourth driving swing rod 1323, and a fourth driven swing rod 1324. The fourth driven swing rod is a triangle frame and consists the combination of a sliding groove swing rod 1327 and two support rods 1328, the three being arranged into a triangle. The sliding groove swing rod 1327 is centrally arranged with a straight line sliding groove 1329 which can pass through the sliding groove swing rod 1327.

One end of the fourth driving swing rod 1323 is hinged with one end of the sliding groove swing rod 1327 through a pin. The pin goes through the straight line sliding groove 1329 on the sliding groove swing rod 1327, and is capable of sliding in the straight line sliding groove 1329. The fourth driving swing rod 1323 and the fourth driven swing rod 1324 are both clamped between the two rocker arms 1326, and can move within the space between the two rocker arms 1326 by means of the pin which is inserted into the straight line sliding groove 1329. One end of the fourth driving swing rod 1323 is fixedly connected to the fourth driven gear 1322 through an axis 1340. At the ends that are in the vicinity of the fourth driven gear 1322, the two rocker arms 1326 are movably sheathed by axis 1340. When the fourth driving swing rod 1323 conducts an upward relative movement and moves to the top of the straight line sliding groove 1329, the two rocker arms 1326 are mobilized to rotate upward round the axis 1340. The other ends of the two rocker arms 1326 are fixed with the fourth fixed clamping plate 1311. The fourth rotational clamping plate 1312 is fixed with the connection ends of the two supporting rods 1328, and is movably sheathed by the hinge axis 13251. Driven by the two supporting rods 1328, the fourth rotational clamping plate 1312 rotates relative to the fourth fixed clamping plate 1311 around the hinge axis 13251.

The forward rotation of the clamping toppling drive motor 1330 actuates the fourth driven gear 1322 to likewise have forward rotation, causing the fourth driving swing rod 1323 to swing upward round the axis 1340. With the aid of the pin inserted into the straight line sliding groove 1329 by the fourth driving swing rod 1323, the fourth driven swing rod 1324 is actuated to swing in a reverse direction (i.e. downwards), thereby displacing the fourth rotational clamping plate 1312 towards the fourth fixed clamping plate 1311 so that the ingredient bag 9 is clamped. In the case that the clamping of the ingredient bag 9 is sustained, the clamping toppling drive motor 1330 continues to rotate forward after the clamping toppling means moves from the clamping station to the feeding station, activating the fourth toppling rocker arm 1325 to rotate and turn over the bag 9, pouring out ingredients inside. Conversely, the reverse rotation of the clamping toppling drive motor 1330 activates the fourth driven gear 1322 to likewise have a reverse rotation, with the fourth toppling rocker arm 1325 rotating following the lead of the fourth driving swing rod 1323 so that the ingredient bag is reset to a state before toppling. In the case that the bag is being clamped, the clamping toppling drive motor 1330 continues with its reverse rotation after the clamping toppling means returns from the feeding station to the clamping station to displace the fourth rotational clamping plate 1312 away from the fourth fixed clamping plate 1311, thereby releasing the ingredient bag 9. The axis 1340 is further provided with a torsion spring (not shown) which synchronizes the fourth toppling rocker arm 1325 with the fourth driving swing rod 1323 when the fourth toppling rocker arm 1325 is returning to the clamping station along with the fourth driving swing rod 1323, so that the fourth fixed clamping plate 1311 and the fourth rotational clamping plate 1312 remains clamping against each other.

The inter-station conveying means comprises an inter-station conveying driver and an inter-station conveying route converter. The inter-station conveying route converter is disposed between the clamping toppling means and the inter-station conveying driver, and is used for converting the torque outputted by the inter-station driver into the torque for driving the clamping toppling means to move between the clamping station and the feeding station.

Reference now is made to FIGS. 10-13. The inter-station conveying driver is an inter-station conveying drive motor 1360. The inter-station conveying route converter includes a fourth driving pulley 1341 which is connected to the conveying drive motor 1360, a fourth driven pulley 1342, a fourth driving belt 1343 which connects the fourth driving pulley 1341 to the fourth driven pulley 1342, a fourth screw rod 1344, a fourth guide rod 1345, a fourth front end bracket 1346 and a fourth tail end bracket 1347 for securing the fourth screw rod 1344 and the fourth guide rod 1345. The fourth screw rod 1344 is in parallel arrangement with the fourth guide rod 1345. The fourth screw rod 1344 is screwed to the fourth front end bracket 1346 and the fourth tail end bracket 1347 via the screw holes arranged thereon. The fourth guide rod 1345 is sheathed by the fourth front end bracket 1346 and the fourth tail end bracket 1347 via the through holes arranged thereon. The output shaft of the fourth driven pulley 1342 is connected to the fourth screw rod 1344.

The inter-station conveying means further comprises a conveying supporting means disposed between the clamping toppling means and the inter-station conveying route converter. The conveying supporting means comprises a translational slide block 1350, used for connecting the clamping toppling means. The translational slide block 1350 is slidably sheathed by the fourth guide rod 1345, and is screwed with the fourth screw rod 1344. The upper end of the translational slide block 1350 is connected to the clamping toppling means, and in particular is fixed to the base of the clamping toppling drive motor 1330.

The forward rotation of the inter-station conveying driver 1360 drives the fourth screw rod 1344 to rotate through the fourth driven pulley 1342, moving the translational slide block 1350 from the clamping station to the feeding station. In the meantime, the reverse rotation of the inter-station conveying driver 1360 drives the fourth screw rod 1344 to rotate, moving the translational slide block 1350 from the feeding station to the clamping station.

4. The Clamping and Conveying-Toppling Mechanism of the Feeding Device 1:

The clamping and conveying-toppling mechanism of the present example is the fourth embodiment of the combinations of the various mechanisms of the feeding device 1, comprising: a bag clamping means for clamping the bag and for limiting its state, and a conveying-toppling means used for moving the bag which is clamped by the bag clamping means between the clamping station and the feeding station and for automatically pouring ingredients inside the bag to the cooking pot. The bag clamping means comprises a clamp, a clamping driver and a clamping route converter. The clamp is disposed at the clamping station and used for clamping or releasing the bag. The clamping route converter is disposed between the clamping driver and the clamp, used for converting the torque outputted by the clamping driver into a clamping torque for driving the clamp to grip the bag and used for converting the torque outputted by the clamping driver into the releasing torque for releasing the bag.

Referring now to FIGS. 14-17, the clamp comprises a fifth fixed clamp 1450 and a fifth rotational clamp 1460. The fifth fixed clamp 1450 includes a lath-shaped second clamping arm 1453, an axle sleeve 1452 disposed at the front portion of the second clamping arm 1453, and a fifth fixed clamping plate 1451 fixed at the front portion of the second clamping arm 1453. The fifth rotational clamp 1460 includes a fifth rotational clamping plate 1461 which opposites to the fifth fixed clamping plate 1451 and is connected to the axle sleeve 1452. By arranging the fifth fixed clamping plate 1451 and the fifth rotational plate 1461, the bag is gripped, and on the other hand, since the two plates have certain heights and widths, they help limit the bag in the process of its being clamped and in the subsequent processes (before the release of the clamping).

The same with the previous embodiment, at opposing positions on the fifth fixed clamping plate 1451 and the fifth rotational clamping plate 1461, there is provided with fifth clamping heads 1454, 1464.

The clamping route converter comprises a sixth driving pulley 1471 which is connected to the output shaft of the clamping drive motor 1480, a sixth driven pulley 1472 which is connected to a fifth clamping pin 1474 inserted into the axle sleeve 1452, and a sixth driven belt 1473 which connects the sixth driving pulley 1471 to the sixth driven pulley 1472.

The clamping drive motor 1480 is fixed to the second clamping arm 1453. The sixth driving pulley 1471 is connected to the output shaft of the clamping drive motor 1480. By means of the fifth clamping pin 1474 inserted into the axle sleeve 1452, the fifth rotational clamping plate 1461 can be rotatably connected to the second clamping arm 1453.

The sixth driven pulley 1472 is secured at one end of the fifth clamping pin 1474 to drive the fifth rotational clamping plate 1461 to rotate.

The forward rotation of the clamping drive motor 1480 activates the rotation of the sixth driven pulley 1472, forming a clamping torque and moving the fifth rotational clamping plate 1461 towards the fifth fixed clamping plate 1451, thereby clamping the ingredient bag 9. Conversely, the reverse rotation of the clamping drive motor 1480 activates the rotation of the sixth driven pulley 1472, forming a releasing torque and moving the fifth rotational clamping plate 1461 away from the fifth fixed clamping plate 1451, thereby releasing the ingredient bag 9.

The conveying-toppling means comprises a conveying-toppling driver and a conveying-toppling route converter. The conveying-toppling route converter is disposed between the bag clamping means and the conveying-toppling driver, and is used for converting the torque outputted by the conveying-toppling driver into a torque for driving the bag clamping means to move between the clamping station and the feeding station, and for converting the torque outputted by the toppling driver into the toppling torque for driving the bag clamping means to topple the bag at the feeding station, and into a returning torque for driving the bag clamping means to reset to a state before toppling.

The conveying-toppling driver is a conveying-toppling drive motor 1440. The conveying-toppling route converter includes a fifth driving pulley 1411 which is connected to the conveying-toppling drive motor 1440, a fifth driven pulley 1412; and a fifth driving belt 1413 which connects the fifth driving pulley 1411 to the fifth driven pulley 1412, a fifth screw rod 1414, a fifth guide rod 1415, a fifth front end bracket 1416 and a fifth tail end bracket 1417 which are respectively fixed to the fifth screw rod 1414 and the fifth guide rod 1415. The fifth driven gear 1423 is fixed to the fifth tail end bracket 1417, and engages a fifth driving gear 1422. The fifth driving pulley 1411 is connected to the output shaft of the conveying-toppling drive motor 1440, and the fifth driven pulley 1412 is connected to the fifth screw rod 1414.

The fifth guide rod 1415 and the fifth screw rod 1414 are both sleeved between the fifth front end bracket 1416 and the fifth tail end bracket 1417 via the through holes arranged on the fifth front end bracket 1416 and the fifth tail end bracket 1417. The fifth screw rod 1414 and the fifth guide rod 1415 are arranged in parallel.

The conveying-toppling means further comprises a conveying supporting means. The conveying supporting means comprises a fifth translational slide block 1430. The translational slide block 1430 is sheathed by the fifth guide rod 1415 and the fifth screw rod 1414, and is screwed with the fifth screw rod 1414. The upper end of the fifth translational slide block 1430 is fixed to the second clamping arm 1453 of the bag clamping means, while the bottom of the fifth translational slide block 1430 is connected to a fifth toppling gear rack 1421 which can be in movable engagement with the fifth driving gear 1422. The conveying-toppling drive motor 1440 starts forward rotation to activate the fifth screw rod 1414 to likewise have forward rotation. The fifth translational slide block 1430 has a translational movement from the fifth front end bracket 1416 towards the fifth tail end bracket 1417. When the fifth translational slide block 1430 comes to the vicinity of the fifth tail end bracket 1417, the fifth toppling gear rack 1421 engages the fifth driving gear 1422, activating the rotation of the fifth driven gear 1423, thereby driving the fifth tail end bracket 1417 to rotate, and causing the fifth translational slide block 1430 and the bag clamped by the bag clamping means which is connected to the fifth translational slide block 1430 to turn over and become toppled. Conversely, the reverse rotation of the conveying-toppling drive motor 1440 activates the reverse rotation of the fifth screw rod 1414, while the fifth toppling gear rack 1421 activates the reverse rotation of the fifth driving gear 1422, causing the fifth translational slide block 1430 and the bag clamped by the bag clamping means which is connected to the fifth translational slide block 1430 to return to a state before toppling. With the continued reverse rotation of the conveying-toppling drive motor 1440, the fifth toppling gear rack 1421 disengage from the fifth driving gear 1422. The fifth translational slide block 1430 has a translational movement from the fifth tail end bracket 1417 towards the fifth front end bracket 1416, thereby completing a cycle from clamping, conveying to toppling.

5. The Clamping-Inverting Feeding Mechanism of the Feeding Device 1

Referring now to FIGS. 18-21 and FIGS. 36-39, it can be seen that as another variation of the feeding system of the present invention, the feeding device 1 further provides a clamping-inverting feeding mechanism, which can be combined with the bag conveying means 2 which is disposed at the clamping station. The clamping-inverting feeding mechanism is arranged at the feeding station, and comprises a clamping-feeding driver, a clamping-feeding route converter, a bag clamping means for clamping the bag and limiting the state of the bag at the feeding station, and a bag inverting means for turning over the bag and pouring out ingredients inside the bag into the cooking pot.

The clamping-feeding route converter is connected to the output shaft of the clamping-feeding driver, and is used for converting the rotational torque, which is inputted to the clamping-feeding route converter by the clamping-feeding driver, into the rotational torque which is outputted to the bag inverting means, and is used for converting the rotational displacement, which is inputted by the clamping-feeding driver, into the clamping displacement which is outputted to the bag clamping means for clamping the ingredient bag and into the releasing displacement for releasing the ingredient bag, so that before the bag inverting means which rotates from the clamping position reaches the toppling position, it securely clamps the bag at the feeding station, and so that after the bag inverting means returns from the toppling position to the clamping position, it releases the bag.

Reference is now made to FIGS. 36-39. As an embodiment of the structure of the clamping-inverting feeding mechanism provided by the present invention, the clamping-feeding driver is a clamping-feeding drive motor (not shown). The bag clamping means comprises a fixed clamping plate 1511 and a movable clamping plate 1521. The movable clamping plate 1521 is connected to the clamping-feeding route converter. The bag inverting means is a turning plate 1541. The bag clamping means further comprises a holding plate 331 for holding the bag in the turning-over process of the turning plate 1541. The holding plate 331 is formed by extending the clamping plane of the movable clamping plate 1521. Likewise, by arranging the fixed clamping plate 1511 and the movable clamping plate 1521, the bag is clamped, and on the other hand, the bag is limited in the clamping process and in the subsequent processes (before the release of the clamping).

Furthermore, since the holding plate 331 is formed by extending the clamping plane of the movable clamping plate 1521, the bag is better supported and the state of the bag is limited in the clamping process, more desirably preventing the deformation of the bag in the conveying or feeding process which may hinder the ingredients from being poured out smoothly, and preventing the ingredients from leaking due to the deformation of the bag.

The clamping-feeding route converter comprises a drive shaft 1511, a clamping cam 1552, a clamping rod 1553 and a cam follower wheel 1554. One end of the turning plate 1541 is movably sheathed by the drive shaft 1551, while the other end of turning plate 1541 is connected to the fixed clamping plate 1511. Being driven by the clamping-feeding drive motor, the turning plate 1541 rotates around the drive shaft 1511. The clamping cam 1552 is fixedly sheathed by the drive shaft 1511. One end of the clamping rod 1553 is connected to the movable clamping plate 1521 so that the clamping plane of the movable clamping plate 1521 faces the clamping plane of the fixed clamping plate 1511, while the other end of the clamping rod 1553 has a rolling connection with the clamping cam 1552 through the cam follower wheel 1554, wherein the cylindrical surface of the cam follower wheel 1554 is in constant contact with the cam surface of the clamping cam 1552. The turning plate 1541 is provided with at least one clamping sliding groove 1217. The clamping rod 1553 is movably arranged inside the clamping sliding groove 1217, By means of the clamping sliding groove 1217 and the clamping cam 1552, the clamping rod 1553 can make a reciprocating straight line displacement within the clamping sliding groove 1217 (to clamp or release the bag 9), and can follow the turning plate 1541 to rotate round the drive shaft 1551 to achieve the turning-over or toppling of the ingredient bag 9, so that the drive shaft 1511 converts the torque inputted by the clamping-feeding drive motor into the turning-over torque for turning-over the turning plate 1541.

Following the turning plate 1541, the clamping rod 1553 rotates, and by means of the clamping cam 1552 (the change of the cam surface diameter), the turning plate 1541, in the process of its turning-over, prompts the clamping face of the movable clamping plate 1521 to draw near towards the clamping face of the fixed clamping plate 1511, thereby firmly clamping the bag. When the bag returns to the feeding station together with the clamping plate 1541, the clamping face of the movable clamping plate 1521 is pulled to move away from the clamping face of the fixed clamping plate 1511, thereby releasing the bag.

Further, the clamping-feeding route converter further comprises a substrate (not shown) and at least one bearing 1216 fixed onto the substrate; the bearing 1216 is provided for carrying the drive shaft 1551 movable sleeved therein.

The clamping cam 1552 is provided with a through hole, and by means of the through hole, the clamping cam 1552 is fixedly sheathed by the drive shaft 1551.

Figure 19:
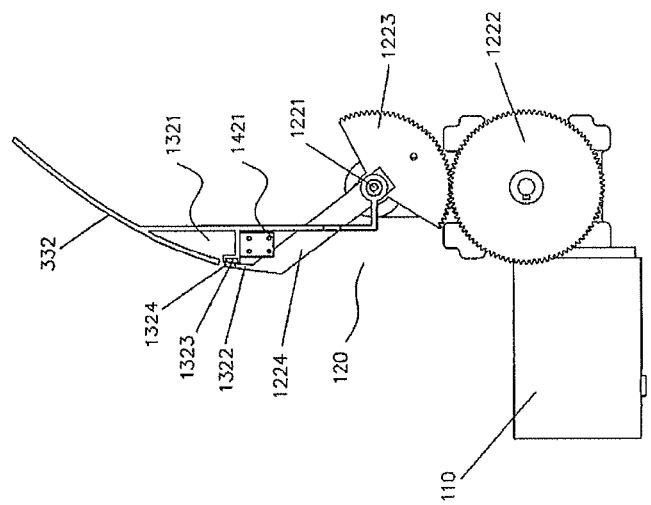
FIG. 19 is a front view showing embodiment 2 of the clamping-inverting mechanism of the feeding device of the feeding system according to the present invention.
Figure 18:
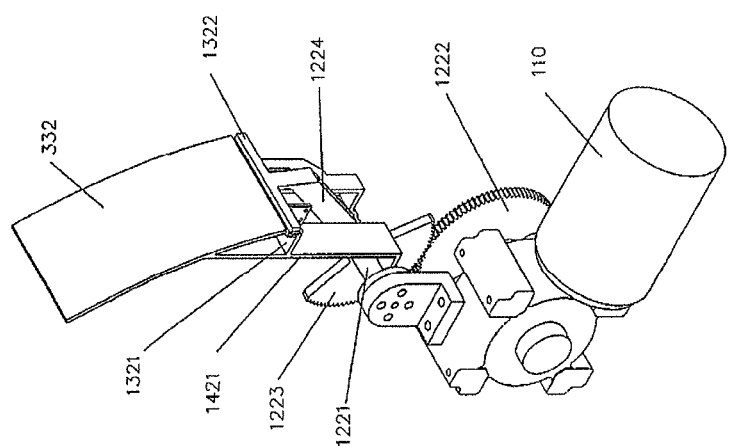
FIG. 18 is a perspective view showing embodiment 2 of the clamping-inverting mechanism of the feeding device of the feeding system according to the present invention.

Reference is now made to FIGS. 18-19. As another embodiment of the clamping-inverting feeding mechanism of the present invention, the clamping-feeding driver is a clamping-feeding drive motor 110. The bag clamping means comprises a fixed clamping plate 1561 and a movable clamping plate 1562. The fixed clamping plate 1562 and the movable clamping plate 1561 are respectively provided with buckle structures which can be mutually buckled. The movable clamping plate 1562 is connected to the clamping-feeding route converter. The bag inverting means is a turning plate 1563.

The clamping-feeding route converter comprises a drive shaft 1571, a driving gear 1572, a clamping turning gear 1573 and a clamping rod 1574. The clamping turning gear 1573 is a sector gear. The turning plate 1563 is fixed to the drive shaft 1571 and can rotate round the drive shaft 1571. The fixed clamping plate 1561 is fixedly disposed on the turning plate 1563. The clamping face of the fixed clamping plate 1561 is parallel to the surface of the turning plate 1563. One end of the clamping rod 1574 is connected to the movable clamping plate 1562, while its other end is fixed to the clamping turning gear 1573. By means of a through hole which passes through the circle center, the clamping turning gear 1573 is sheathed by the drive shaft 1571 to enable the clamping face of the movable clamping plate 1562 to face the clamping face of the fixed clamping plate 1561. The driving gear 1572 is connected to the output shaft of the clamping-feeding drive motor 110, and is engaged with the clamping turning gear 1573.

Particularly, the buckle structures which are mutually buckable on the movable clamping plate 1562 and on the fixed clamping plate 1561 include a trapezoidal groove 1564 which is disposed on the clamping face of the fixed clamping plate 1561 and the groove mouth of the trapezoidal groove 1564 is smaller than its bottom, and a protruding ridge 1565 which is disposed on the clamping face of the movable clamping plate 1562 and which can be movably inserted into the groove 1564. When the protruding ridge 1565 is buckled to the groove 1564, the movable clamping plate 1562 snap fits the fixed clamping plate 1561. Meanwhile, the drive shaft 1571 also has a torsion spring (not shown), which ensures a relative force between the clamping rod 1574 and the turning plate 1563, thereby guaranteeing the sustention and the reset of the clamping force between the fixed clamping plate 1561 and the movable clamping plate 1562.

Further, the end face of the turning plate 1563 is parallel to the drive shaft 1571, and the end face of the turning plate 1563 is provided with a holding plate 332 for carrying the bag in the process of turning-over the turning plate 1563.

When the bag enters the feeding station, the clamping-feeding drive motor 110 outputs a forward rotational torque, and by means of the driving gear 1572 and the clamping turning gear 1573, the clamping face of the movable clamping plate 1562 displaces towards the clamping face of the fixed clamping plate 1561 and firmly clamps the bag, and at the same time, the movable clamping plate 1562 snap fits the fixed clamping plate 1561 to further activate the turning plate 1563 which is connected to the fixed clamping plate 1561 to turn over. When the feeding of the ingredients is completed, the clamping-feeding drive motor 110 outputs a reverse rotational torque. By means of the driving gear 1572 and the clamping turning gear 1573, the fixed clamping plate 1561 and the movable clamping plate 1562 which are buckled, is reverted, further prompting the turning plate 1563 connected to the fixed clamping plate 1561 to reversely rotate. In addition, when the bag returns to the feeding station, the clamping turning gear 1573 continues its reverse rotation, prompting the fixed clamping plate 1561 to disconnect from the buckle structure of the movable clamping plate 1562, displacing the clamping face of the movable clamping plate 1562 away from the clamping face of the fixed clamping plate 1561, thus releasing the bag.

Figure 21:
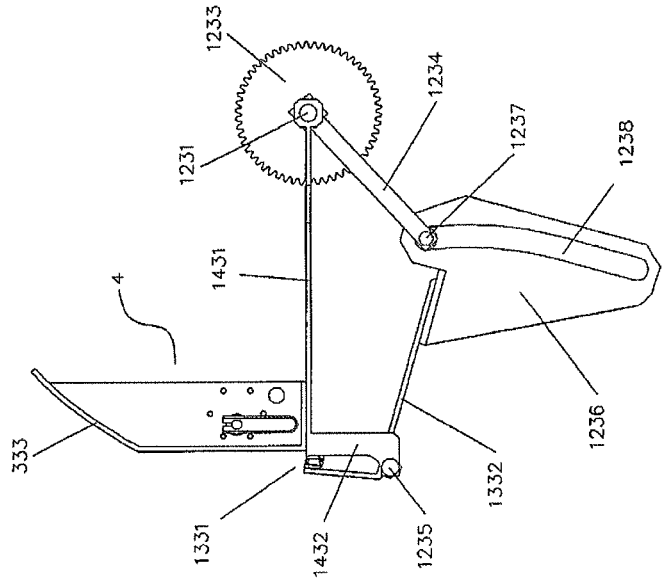
FIG. 21 is a front view showing embodiment 3 of the clamping-inverting mechanism of the feeding device of the feeding system according to the present invention.
Figure 20:
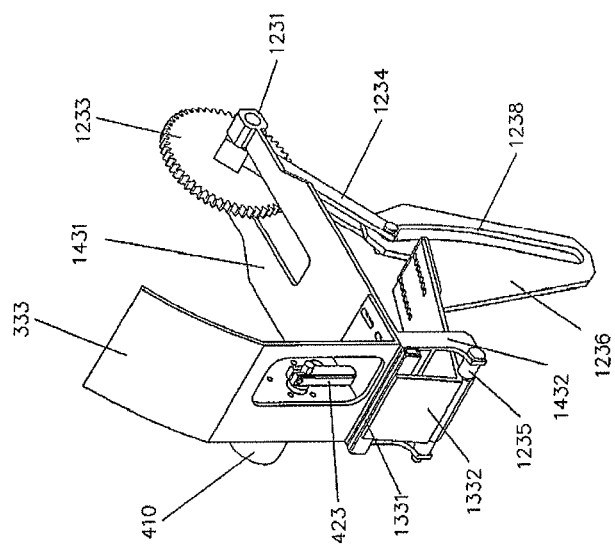
FIG. 20 is a perspective view showing embodiment 3 of the clamping-inverting mechanism of the feeding device of the feeding system according to the present invention.
Figure 22:
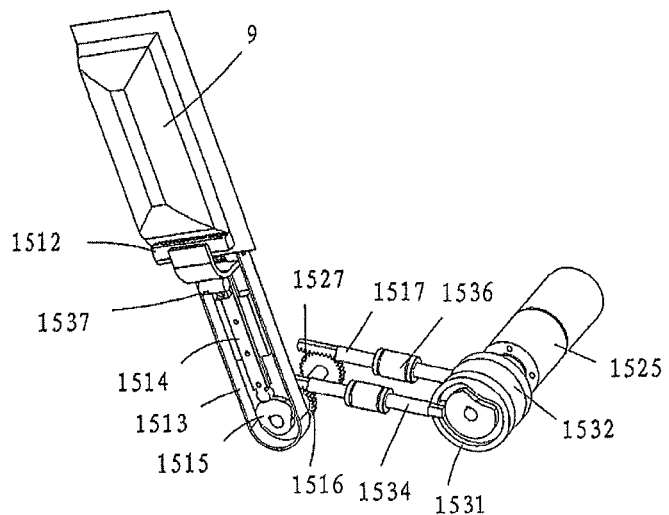
FIG. 22 is a first view showing the clamping and toppling mechanism in an embodiment of the feeding device of the feeding system according to the present invention.
Figure 23:
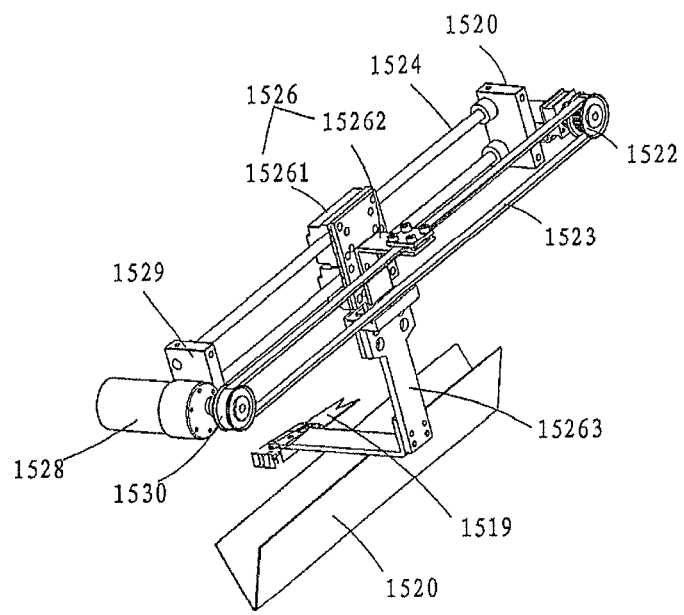
FIG. 23 is a second view showing the clamping and toppling mechanism in the embodiment of the feeding device of the feeding system according to the present invention.
Figure 24:
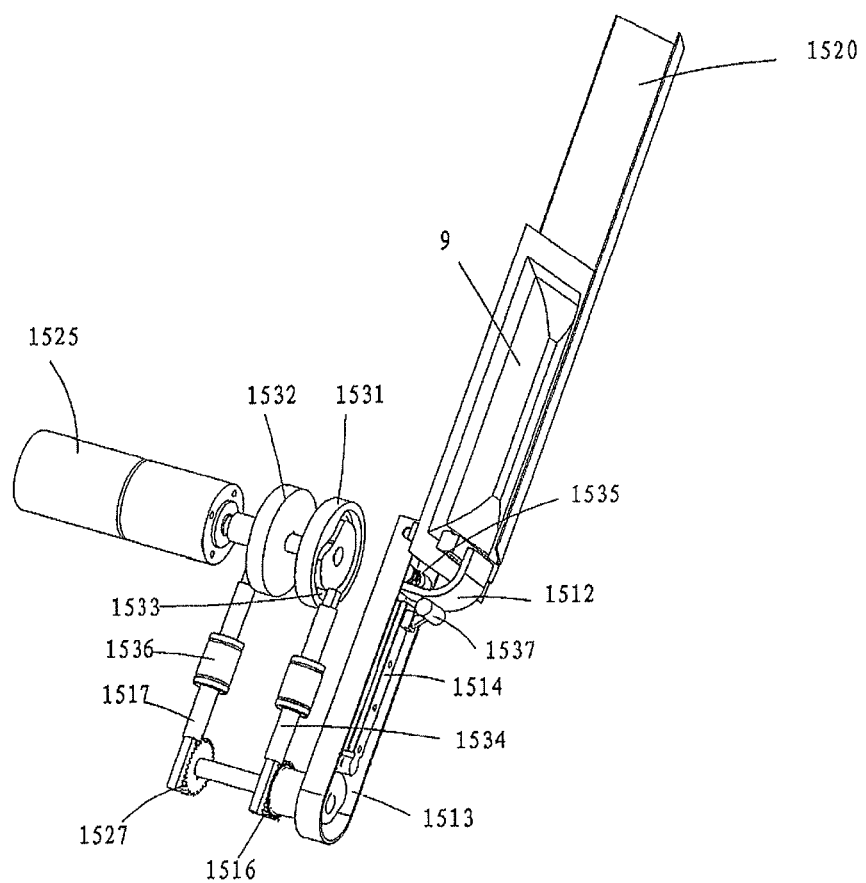
FIG. 24 is a third view showing the clamping and toppling mechanism in the embodiment of the feeding device of the feeding system according to the present invention.
Figure 25:
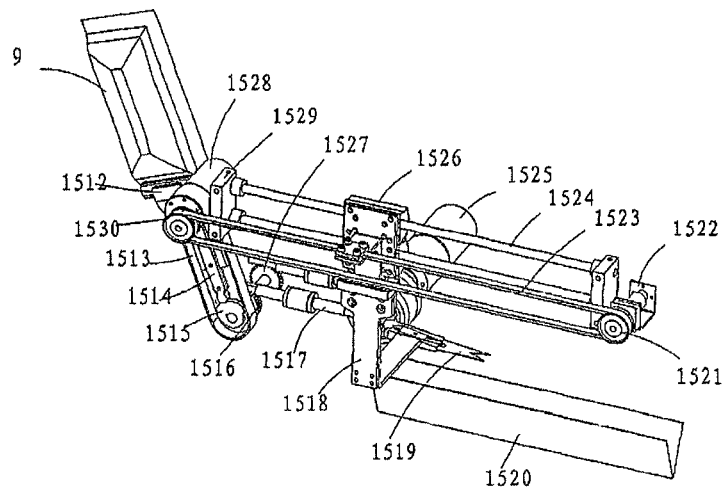
FIG. 25 is a fourth view showing the clamping and toppling mechanism in the embodiment of the feeding device of the feeding system according to the present invention.
Figure 26:
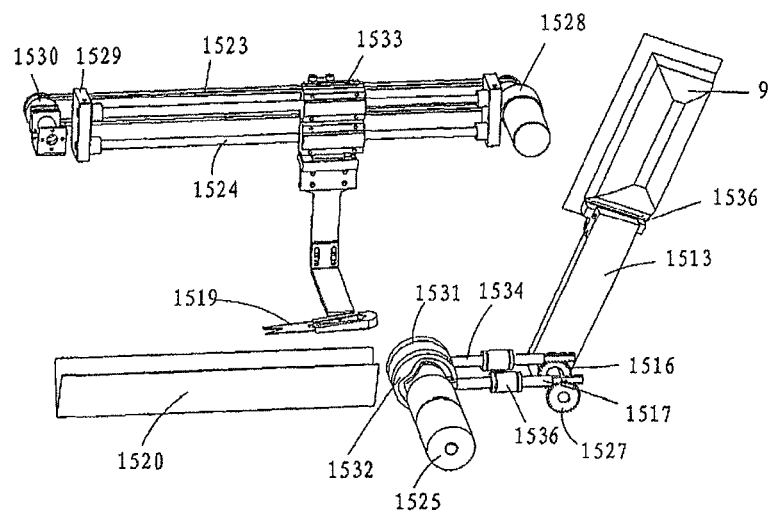
FIG. 26 is a fifth view showing the clamping and toppling mechanism in the embodiment of the feeding device of the feeding system according to the present invention.

Referring to FIG. 20-FIG. 21, in the third embodiment of the clamping-inverting feeding mechanism of the present invention, the clamping-feeding driver is a clamping-feeding drive motor 110 (in conjunction with FIG. 1). The bag clamping means includes a fixed clamping plate 1331 and a movable clamping plate 1332. The fixed clamping plate 1331 and the movable clamping plate 1332 are respectively provided with buckle structures which can be mutually buckled. The movable clamping plate 1332 is connected to the clamping-feeding route converter. The bag inverting means is a turning plate 1431. The clamping-feeding route converter comprises a drive shaft 1333, a driving gear 1334 (in conjunction with FIG. 1), a clamping turning gears 1335, a clamping rod 1336, a clamping shaft 1337, a cam track plate 1338 and a cam follower wheel 1339.

One end of the turning plate 1431 is movably sheathed by the drive shaft 1333 and can rotate round the drive shaft 1333. The fixed clamping plate 1331 is fixed to the end face of the turning plate 1431, which is parallel to the drive shaft 1333. The clamping face of the fixed clamping plate 1331 is parallel to the axis of the drive shaft 1333. The movable clamping plate 1332 is formed by bending a flat plate. At the bend of the movable clamping plate 1332, there is provided with an axle sleeve and by means of the sleeve, the movable clamping plate 1332 is movably sheathed by the clamping shaft 1337. In the meantime, both end faces of the movable clamping plate 1332 is parallel to the clamping shaft 1337. One end face is so arranged that it faces the clamping face of the fixed clamping plate 1331, while the other end face is connected to the cam track plate 1338. The cam track plate 1338 is provided with a cam track groove 1238. The clamping shaft 1337 follows the turning plate 1431 to rotate around the drive shaft 1333.

One end of the clamping rod 1336 is fixedly connected to the clamping turning gear 1335 and rotates together with the clamping turning gear 1335, while the other end of the clamping rod 1336 is connected to the cam follower wheel 1339. The cam follower wheel 1339 is arranged within the cam track groove 1238, and the cylindrical surface of the cam follower wheel 1339 is constantly in contact with the inner wall of the cam track groove 1238.

The driving gear 1334 is connected to an output shaft of the clamping-feeding drive motor 110, and is engaged with the clamping turning gear 1335. By means of a through hole which passes through the circle center, the clamping turning gear 1335 is fixedly connected to the drive shaft 1333.

At the end which is provided with the fixed clamping plate 1331, the turning plate 1431 is provided with clamping shaft fixing boards 1432, whose board faces straightly opposite each other and symmetrically extend downwards. The clamping shaft 1337 is fixedly connected between the two clamping shaft fixing boards 1432, so that the clamping shaft 1337 rotates round the drive shaft 1333 along with the turning plate 1431. Similarly, the drive shaft 1333 also has a torsion spring (not shown), which can ensure a relative force between the clamping rod 1336 and the turning plate 1431, and thereby guaranteeing the sustention and the reset of the clamping force between the fixed clamping plate 1331 and the movable clamping plate 1332.

Further, the end of the turning plate 1431 which is arranged with the fixed clamping plate 1331, is provided with a holding plate 333 for carrying the bag in the process of the turning-over. The holding plate 333 is provided with a bending face.

When the bag enters the feeding station, the clamping-feeding drive motor 110 outputs a forward rotational torque, and by means of the driving gear 1334 and the clamping turning gear 1335, the cam follower wheel 1339 and the cam track plate 1338, the rotational displacement of the clamping-feeding drive motor 110 is converted to the displacement of the movable clamping plate 1332 towards the fixed clamping plate 1331, thereby prompting the movable clamping plate 1332 and the fixed clamping plate 1331 to firmly clamp the bag, and further activating the turning plate 1431 connected to the fixed clamping plate 1331 to turn over.

When the feeding of the ingredients is completed, the clamping-feeding drive motor 110 outputs a reverse rotational torque. By means of the driving gear 1334, the clamping turning gear 1335, the cam follower wheel 1339 and the cam track plate 1338, the turning plate 1431 which is connected to the fixed clamping plate 1331 is turned over, and when the bag returns to the feeding station, the clamping turning gear 1335 continues its reverse rotation, so that the rotational displacement outputted by the clamping-feeding drive motor 110 is converted to the displacement of the movable clamping plate 1332 away from the fixed clamping plate 1331, thus releasing the bag.

6. The Clamping and Toppling Mechanism of the Feeding Device 1:

Reference now is made to FIGS. 22-26. The sixth embodiment of the feeding device 1 in the present invention can also be a clamping and toppling mechanism, comprising: a bag clamping means for clamping and limiting the bag containing cooking ingredients, an ingredient toppling means for automatically pouring ingredients inside the bag into the cooking pot, and a bag cutting means for cutting the upper end of the bag before pouring out the ingredients.

The bag clamping means comprises a clamp, a clamping driver and a clamping route converter. The clamp is disposed at the clamping station for clamping or releasing the bag. The clamping route converter is used for converting the torque outputted by the clamping driver into the clamping torque for activating the clamp to grip the bag or into the releasing torque for releasing the bag.

Referring again to FIGS. 22-26, the clamping driver is a clamping drive motor 1525. The bag clamping means comprises a fixed clamping head 1536 and a movable clamping head 1512, the two being arranged at opposing positions.

The clamping route converter includes a first outer shaft cam 1532, provided on the output shaft of the clamping drive motor 1525 (or connected to the output shaft of the clamping drive motor 1525, so that the first outer shaft cam 1532 is driven to rotate by the output shaft), the first outer shaft cam 1532 is provided with a first track groove. One end of a first connecting rod 1517 has a roller wheel (not shown) which can move within the track groove of the first outer shaft cam 1532, while the other end of the first connecting rod 1517 has a gear rack structure which can be engaged with a clamping gear 1527. The fixed shaft of the clamping gear 1527 is provided with an inner shaft cam 1515. The inner shaft cam 1515 is provided with a sliding rod 1514, one end of which props against the inner shaft cam 1515. One end of the sliding rod 1514 is provided with a roller wheel which can slide along the periphery of the inner shaft cam 1515, while the other end of the sliding rod 1514 has a touch block 1537. The touch block 1537 is in contact with the movable clamping head 1512. By moving the sliding rod 1514 on the inner shaft cam 1515, the touch block 1537 moves along the periphery of the inner shaft cam 1515 to activate the swing of the movable clamping head 1512 relative to the fixed clamping head 1536, thereby clamping the bag. On the swinging shaft used for arranging the movable clamping head 1512, there is provided with a spring 1535 which can reset the movable clamping head 1512.

The ingredient toppling means comprises a toppling driver and a toppling route converter. The toppling route converter is used for converting the torque outputted by the toppling driver into a toppling torque for driving the bag clamping means to topple the bag at the feeding station, and into the returning torque for driving the bag clamping means to reset to a state before toppling.

The driving force of the toppling driver comes from the clamping drive motor 1525. The toppling route converter comprises a second outer shaft cam 1531. The second outer shaft cam 1531 is arranged on the fixed shaft of the first outer shaft cam 1532 and comprises a track groove. One end of a second connecting rod 1534 has a roller wheel 1533 which can move within the track groove of the second outer shaft cam 1531, while the other end of the second connecting rod 1534 has a gear rack structure which can be engaged with a toppling gear 1516. The fixed shaft of the toppling gear 1516 is connected to one end of a feeding arm 1513. The other end of the feeding arm 1513 is provided with the fixed clamping head 1536 and the movable clamping head 1512.

Further, the first connecting rod 1517 and the second connecting rod 1534 are sheathed by a straight line bearing 1538 to facilitate the straight line sliding of the two connecting rods.

In particular, the center of the toppling gear 1516 is provided with a through hole. The fixed shaft of the clamping gear 1527 can pass through the center of the toppling gear 1516. The inner shaft cam 1515 is fixed to one end of the fixed shaft. The feeding arm 1513 has an elongated through hole. The inner shaft cam 1515 and the sliding rod 1514 can be disposed in the elongated through hole. The axial centerline of the sliding rod 1514 is at the same line with the axial centerline of the feeding arm 1513, so as to reduce the weight of the feeding arm 1513 and to save space for the layout of the mechanism.

Referring again to FIGS. 22-26, the bag cutting means comprises an opening blade 1519. The opening blade 1519 is arranged at the upper part of the bag fixing groove 1520, connected to a mobile means via a connecting member 1526.

The mobile means includes a opening motor 1528, and a seventh driving wheel 1530 which is connected to the output shaft of the opening motor 1528, a seventh driven wheel 1522 and a seventh synchronous belt 1523 which is set on the seventh driving wheel 1530 and the seventh driven wheel 1522. One end of the connecting member 1526 is fixedly connected to the seventh synchronous belt 1523, while the other end of the connecting member 1526 is connected to the opening blade 1519.

Particularly, the connecting member 1526 includes a bent connecting rod 15263, a connecting bracket 15261 and a sliding panel 15262. The lower end of the connecting rod 15263 is used for fixing the opening blade 1519, while the upper end of the connecting rod 15263 is connected to the sliding panel 15262. The sliding panel 15262 is fixed on the seventh synchronous belt 1523 and at the same time, connected to the connecting bracket 15261. The connecting bracket 15261 is sheathed by two parallel sixth guide rods 1524 or rails (not shown).

In the operating mode, the clamping drive motor 1525 is started. When the first outer shaft cam 1532 rotates to a certain angle, the roller wheel inside the track groove rolls. The first connecting rod 1517 has a translational movement along the straight line bearing 1536, driving the clamping gear 1527 to rotate through the gear rack at its end portion. The inner shaft cam 1515 rotates to drive the sliding rod 1514 to have a translational movement and then prop against the movable clamping head 1512 for the rotation, thereby clamping the ingredient bag 9. Then, the motor 1528 is switched on to rotate. The seventh synchronous belt 1523 has a translational movement, and the opening blade 1519 moves along the sixth guide rod 1524. The bag is cut by means of the opening blade 1519. Meanwhile, the second outer shaft cam 1531 is rotated to a certain angle, and the roller wheel 1533 moves along with its track groove. The second connecting rod 1534 has a translational movement along the straight line bearing 1536, and via the gear racks at its end portion, drives the toppling gear 1516 to rotate, further bringing the feeding arm 1513 to swing and thereby completing the action of feeding.

Referring to FIGS. 27-42, the feeding system of the present invention further comprises a compressing mechanism 3 disposed at the feeding station for compressing the bag under the control of a control system in the process of turning over and/or toppling the bag, so that the cooking ingredients inside the bag are completely fed into the cooking pot.

The compressing may be done by squeezing the bag, or pressing the bag and then press-pushing or rolling over the bag towards the opening of the bag, or winding the bag in such a way that cooking ingredients inside the bag are squeezed out.

The above compressing mechanism comprises a compressing driver and a compressing unit which, under the control of the compressing driver, compresses the toppled bag to squeeze the ingredients out of the bag and to feed them into the cooking pot. The compressing mechanism further comprises a compressing route converter. The compressing route converter is connected to the compressing driver, and outputs a torque to the compressing unit. That is to say, the torque outputted by the compressing driver is converted into the compressing torque of the compressing unit, or into the pressing torque for push-pressing the bag towards the opening of the bag, and into the releasing torque for releasing the compression when the compressing unit has a reverse movement.

Figure 27:
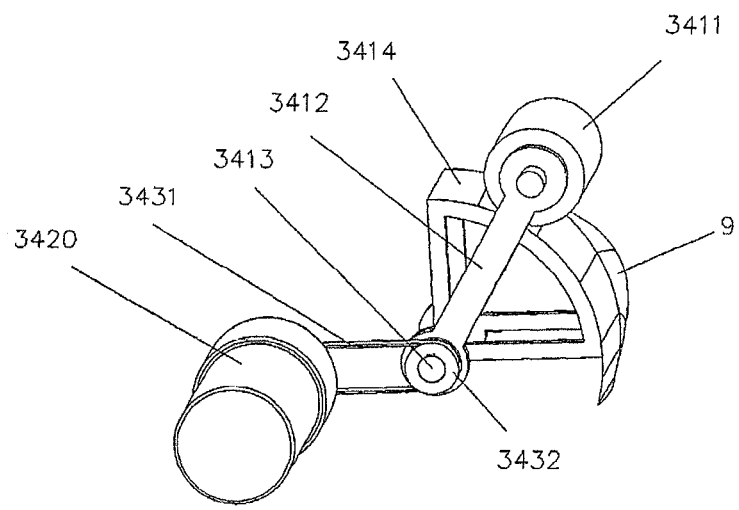
FIG. 27 is a schematic view showing the structure of embodiment 1 of the compressing mechanism in the feeding system of the present invention.

Referring to FIG. 27, in one embodiment of the compressing mechanism 3 of the feeding system of the present invention, the compressing unit is a roller unit. The roller unit comprises a fixed roller member and a movable roller member. The fixed roller member and the movable roller member are respectively arranged at the two sides of the toppled bag. Driven by the compressing driver, the movable roller member moves towards the fixed roller member, and pins the bag at the surface of the fixed roller member. In the case that the bag is pinned, the movable roller member rolls towards the opening of the bag, squeezing out the ingredients from the bag and feeding them into the cooking pot.

Particularly, the compressing driver is a compressing drive motor 3420. The compressing unit comprises a fixed roller member and a movable roller member which are respectively disposed at the two sides of the bag. The bag is sandwiched between the fixed roller member and the movable roller member. The fixed roller member is an arc-shaped sliding pallet 3414. The movable roller member has a roller wheel 3411. The compressing route converter comprises a rocker arm 3412, and the bottom of the rocker arm 3412 is hinged with a pin 3413. The pin 3413 is a rotary shaft of a pulley 3432 and is connected to the output shaft of the compressing drive motor 3420 through a synchronous belt 3431. That is to say, the compressing drive motor 3420 can transmit the driving force to the pin 3413. The upper end of the rocker arm 3412 is hinged with the roller wheel 3411. The roller wheel 3411 is in contact with the arc-shaped sliding pallet 3414. Driven by the compressing drive motor 3420, the rocker arm 3412 can sway to further actuate the roller wheel 3411 to slide along the arc surface of the sliding pallet 3414, rolling over the bag between the movable roller member and the fixed roller member, so that ingredients inside the bag are squeezed out.

Figure 28:
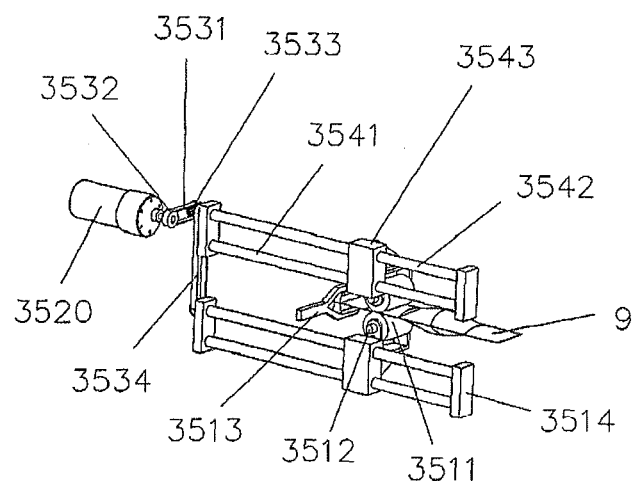
FIG. 28 is a schematic view showing the structure of embodiment 2 of the compressing mechanism in the feeding system of the present invention.

Referring to FIG. 28, in the second embodiment of the compressing mechanism 3 of the present invention, the compressing unit is a roller unit. The roller unit comprises at least one pair of movable roller members. Each pair of the movable roller members are respectively arranged at the two sides of the toppled bag, and driven by the compressing driver, the movable roller members displace in directions facing each other from the two sides of the bag to pin the bag. In the case that the bag is pinned, the roller members roll towards the opening of the bag to squeeze ingredients inside the bag out of the opening of the bag and feed the ingredients into the cooking pot.

Particularly, the compressing driver is a compressing drive motor 3520. The output shaft of the compressing drive motor 3520 is connected to a driving compression pulley 3532. The driving compression pulley 3532 is connected to a driven compression pulley 3533 through a synchronous belt 3531, and can transmit the torque outputted by the compressing drive motor 3520 to the driven compression pulley 3533. Each of the movable roller members comprise a roller 3512 and a roller wheel 3511 set on the roller 3512. The two rollers 3512 are fastened by a supporting seat and are respectively arranged at an upper and a lower position. Clamped between each pair of the roller wheels 3511, the bag is fixed by a fixed clamp 3513. The rollers 3512 are connected to the torque output end of the compressing route converter.

The compressing route converter includes slider assemblies 3543 which are provided in pairs and in upper-lower arrangement. Each of the slider assembly 3543 is slidably arranged on a rotatable screw rod 3542 and a guide rod 3541 which is parallel to the screw rod 3542. The slider assembly 3543 is connected to the supporting seat for fastening the rollers 3512. Both ends of the screw rod 3542 and the guide rod 3541 are respectively rotatably connected to the sliding groove fastener 3514. At one end of the screw rod 3543 and the guide rod 3541, there is also provided with a connecting plate 3534, which can connect and fasten the two sets of sliding groove fasteners 3514 which are in an upper-lower arrangement. Meanwhile, one screw rod 3542 may be extended beyond the connecting plate 3534 and serves as a rotational shaft of the driven compression pulley 3533. The driving force can be transmitted from the driven compression pulley 3533 to the screw rod 3542 to further drive the screw rod 3542 to rotate. Since the slider assemblies 3543 are slidably arranged on the screw rods 3542 and the guide rods 3541, the slider assemblies 3543 can, driven by the screw rods 3542, slide along the axes of the screw rods 3542 and the guide rods 3541, and can further enable the rollers 3512, which are connected to the slider assemblies 3543 and are arranged at both sides of the bag, to follow and slide along the screw rods 3542 and the guide rods 3541, thereby rolling over and compressing the bag clamped between the two rollers to squeeze ingredients out of the bag. In the present mechanism, the bag remains static, and the compression is done by the compressing unit.

Figure 29:
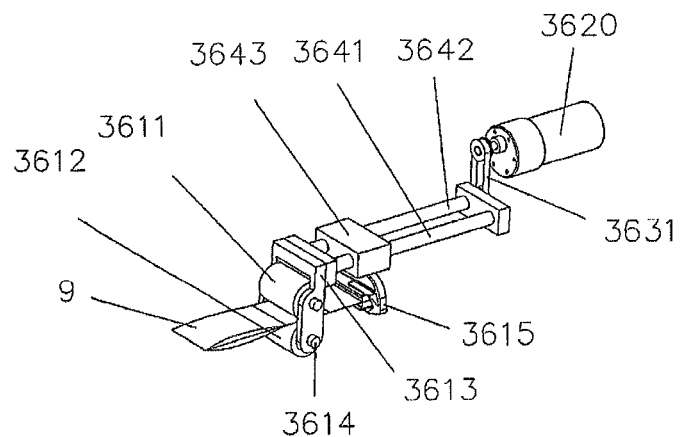
FIG. 29 is a schematic view showing the structure of embodiment 3 of the compressing mechanism in the feeding system of the present invention.

Referring to FIG. 29, in the third embodiment of the compressing mechanism 3 of the feeding system of the present invention, the compressing driver is a compressing drive motor 3620, whose output shaft is connected to the synchronous belt 3631. The compressing unit is a roller unit. The roller unit comprises movable roller members which are arranged in pairs. The movable roller members comprise a pair of rollers 3613 as well as a driving roller wheel 3611 and a driven roller wheel 3612 which are respectively set on each of the rollers 3613. The driving roller wheel 3611 and the driven roller wheel 3612 are fixed on a roller bracket 3614. The fixing clamp 3615 for fixing the bag is connected to the torque output end of the compressing route converter.

The compressing route converter comprises a slide block 3643 which can be connected to the fixing clamp 3615. One end of the bag is disposed on the fixing clamp 3616. The slide block 3643 is slidably disposed on the rotatable screw rod 3642 and on the guide rod 3641 which is arranged in parallel to the screw rod 3642. The screw rod 3642 is connected to the synchronous belt 3631 of the compressing driver. By allowing the synchronous belt 3631 to drive the screw rod 3642 to rotate, the slide block 3643 slides along the axes of the screw rod 3642 and the guide rod 3641. At the same time, by allowing the slide block 3643 to drive the bag which is disposed on the fixing clamp 3615 to move, the ingredient bag 9, driven by the fixing clamp 3615, passes through the gap between the driving roller wheel 3611 and the driven roller wheel 3612 and is then rolled over so that ingredients contained in the bag are squeezed out.

Figure 30:
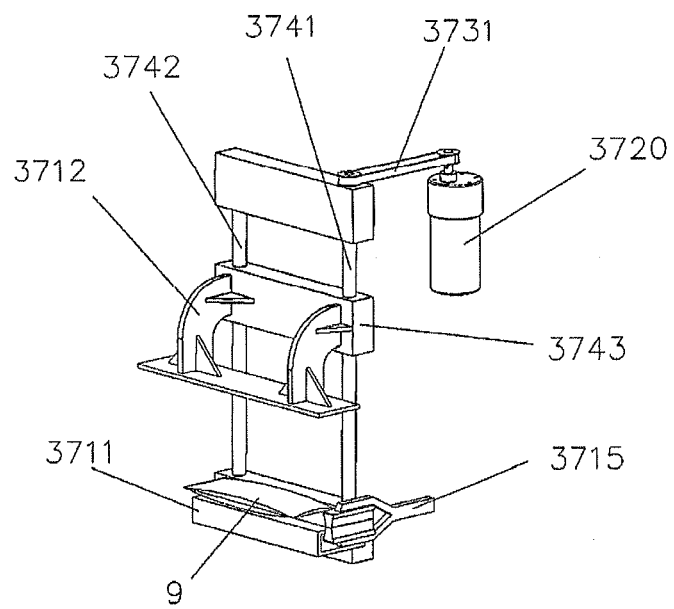
FIG. 30 is a schematic view showing the structure of embodiment 4 of the compressing mechanism in the feeding system of the present invention.
Figure 31:
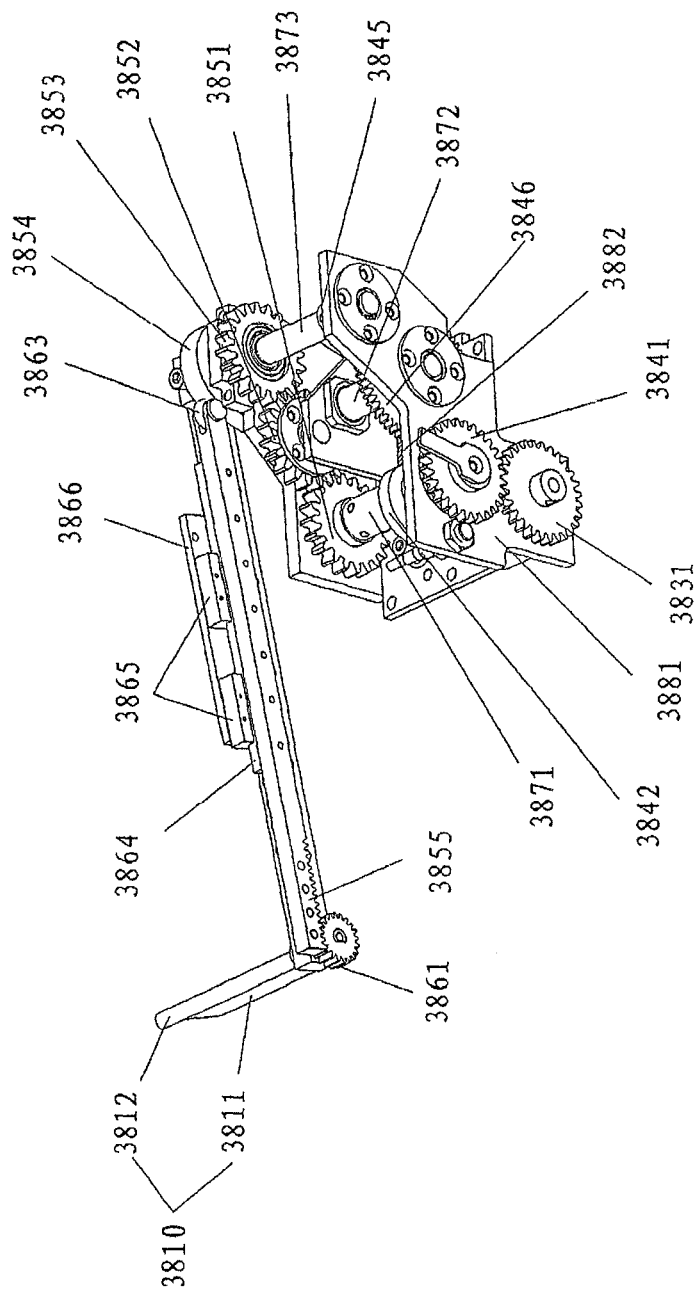
FIG. 31 is a first schematic view showing the structure of embodiment 5 of the compressing mechanism in the feeding system of the present invention.
Figure 32:
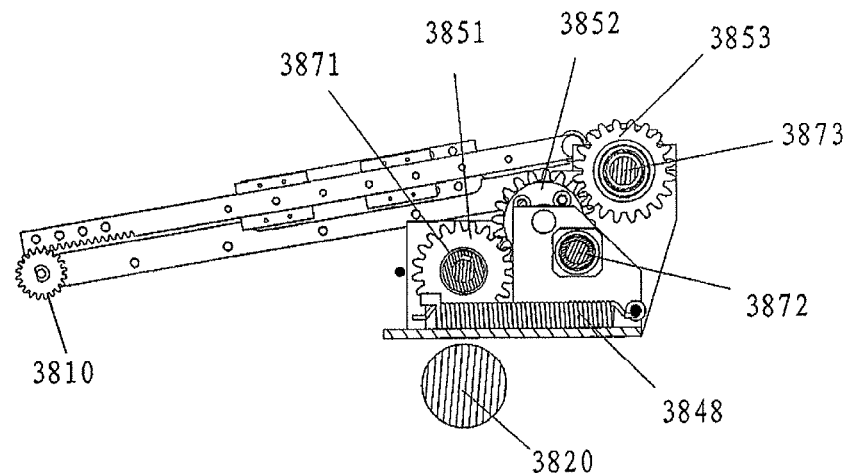
FIG. 32 is a second schematic view showing the structure of embodiment 5 of the compressing mechanism in the feeding system of the present invention.
Figure 33:
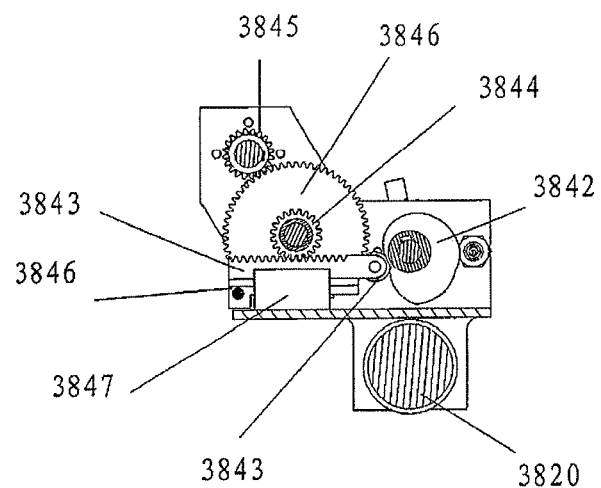
FIG. 33 is a third schematic view showing the structure of embodiment 5 of the compressing mechanism in the feeding system of the present invention.
Figure 34:
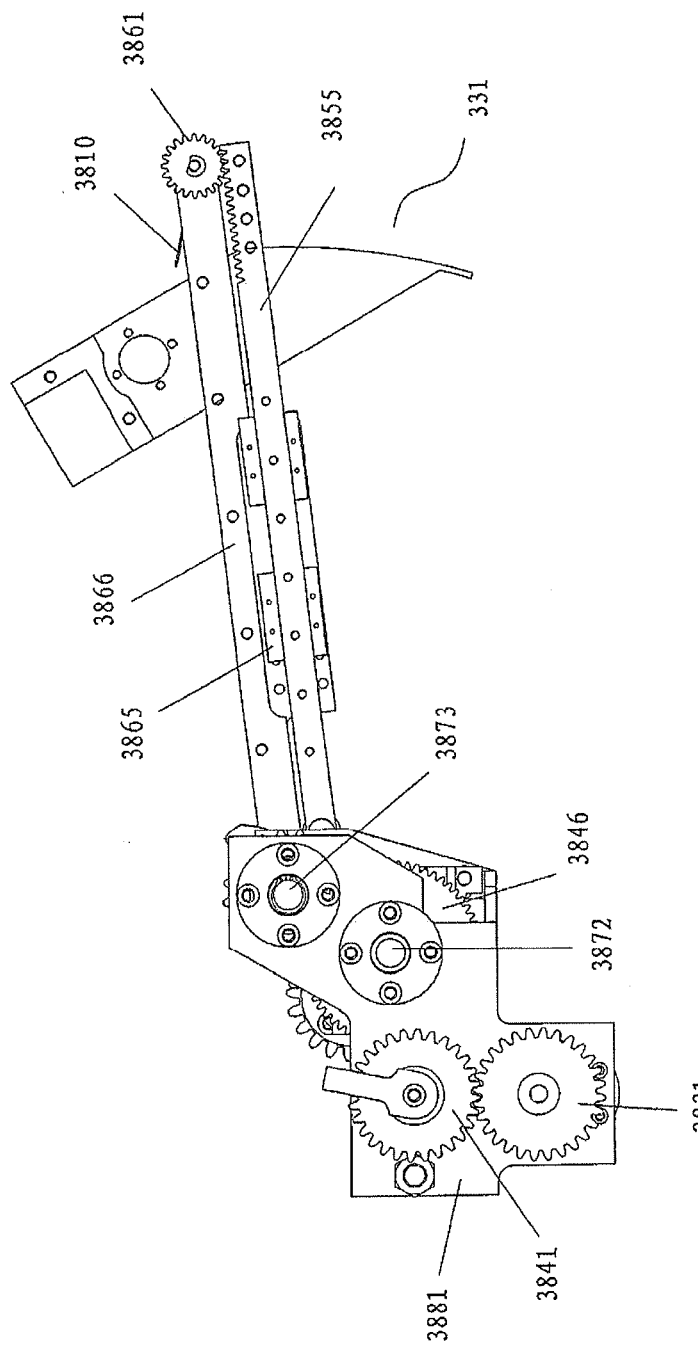
FIG. 34 is a first view showing the structure and state of embodiment 5 of the compressing mechanism in the feeding system of the present invention.
Figure 35:
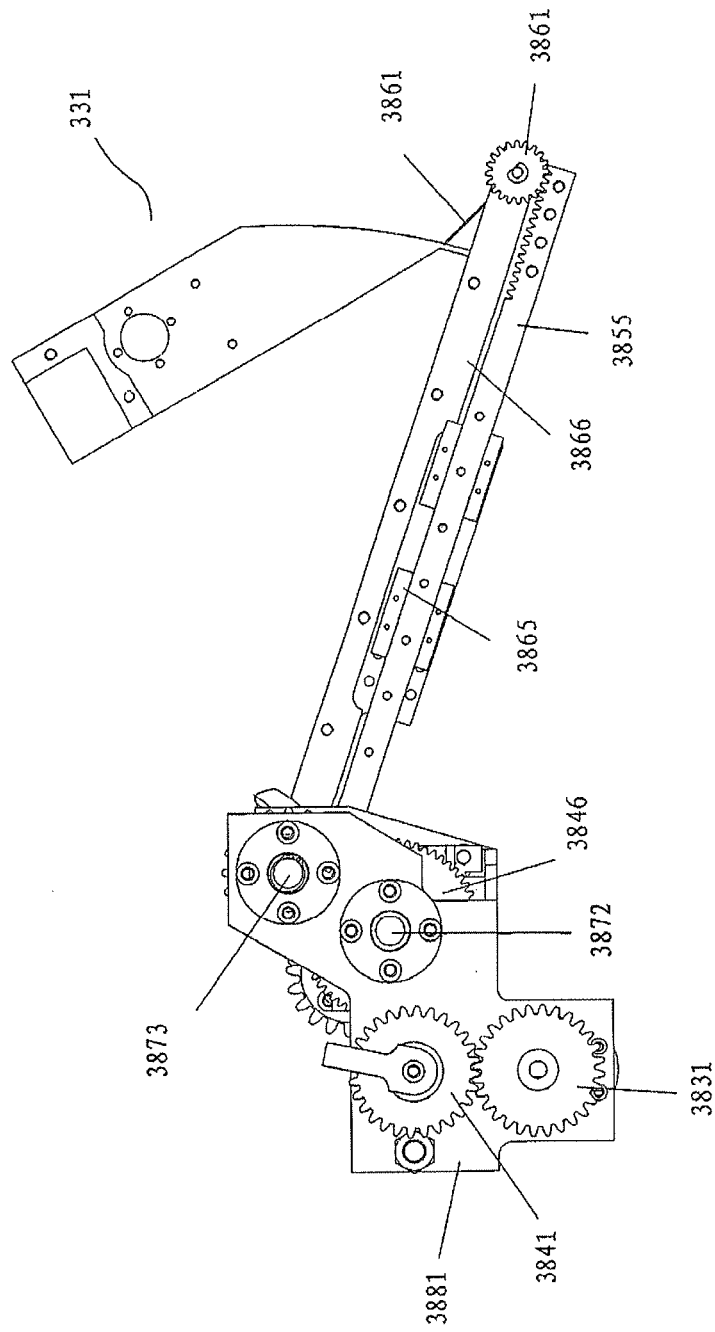
FIG. 35 is a second view showing the structure and state of embodiment 5 of the compressing mechanism in the feeding system of the present invention.
Figure 36:
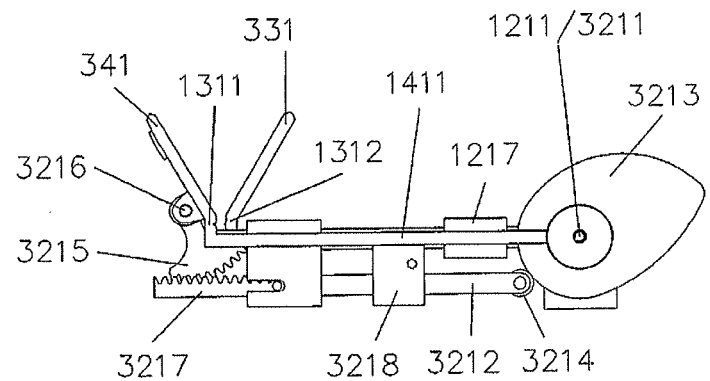
FIG. 36 is a front view showing the combination of embodiment 6 of the compressing mechanism with embodiment 1 of the clamping-inverting feeding mechanism in the feeding system of the present invention.
Figure 37:
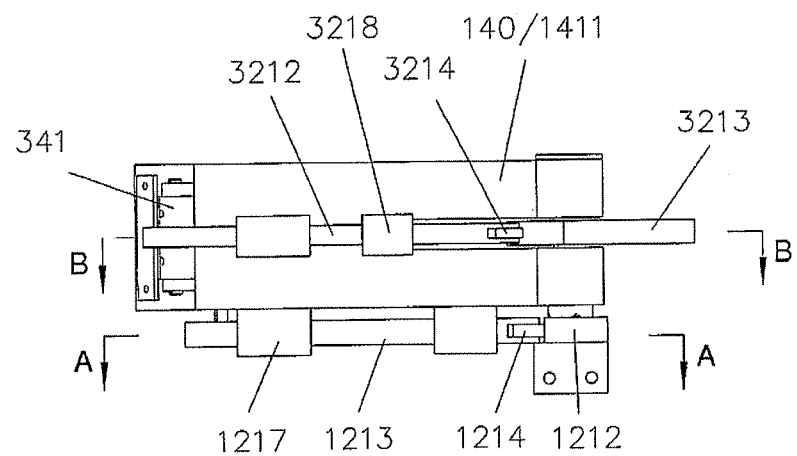
FIG. 37 is a top view showing the combination of embodiment 6 of the compressing mechanism with embodiment 1 of the clamping-inverting feeding mechanism in the feeding system of the present invention.
Figure 38:
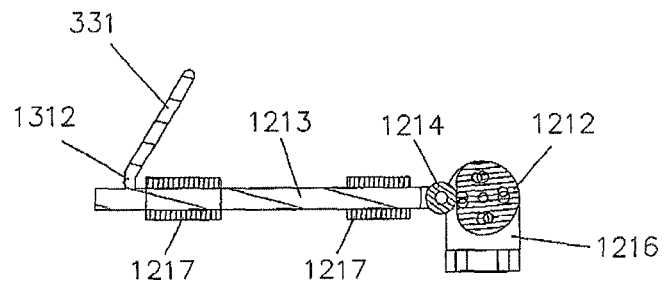
FIG. 38 is a sectional view along A-A of FIG. 37.
Figure 39:
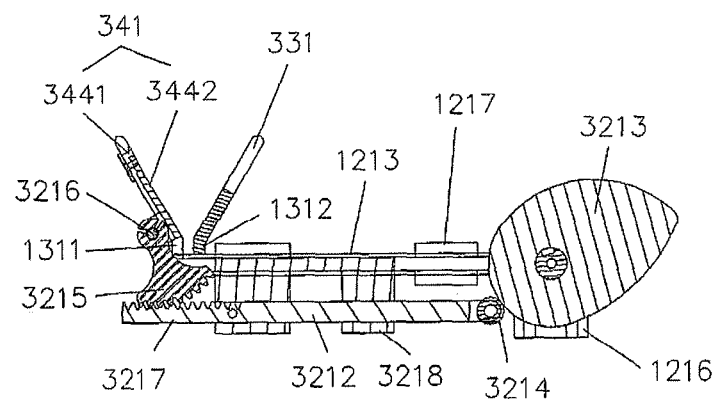
FIG. 39 is a sectional view along B-B of FIG. 37.

Referring to FIG. 30, in the fourth embodiment of the compressing mechanism 3 of the feeding system of the present invention, the compressing driver is a compressing drive motor 3720, whose output shaft is connected to the synchronous belt 3731. The compressing unit comprises a static compressing member 3711 and a movable compressing member 3712 which can move relative to the static compressing member. The bag is horizontally disposed on the support face of the static compressing member 3711 through a fixing clamp 3715. The support face may be planar or curved. The movable compressing member 3712 has a clamping face which opposites the support face of the static compressing member 3711. The compressing route converter comprises a slide block 3743 which can be fixedly connected to the movable compressing member 3712. The slide block 3743 is slidably disposed on the rotatable screw rod 3741 and on the guide rod 3742 which is arranged in parallel to the screw rod 3741. The screw rod 3741 is connected to the synchronous belt 3731 of the compressing driver. By means of the synchronous belt 3731, the screw rod 3741 is driven to rotate by the compressing drive motor 3720 for allowing the movable compressing member 3712 slides along the screw rod 3741 and the guide rod 3742. When the movable compressing member 3712 reaches the ends of the screw rod 3741 and guide rod 3742 that are arranged with the fixing clamp 3715, it compresses the bag disposed on the support face of the static compressing member 3711 to squeeze out ingredients inside the bag.

Referring now to FIG. 31 to FIG. 35, in the fifth embodiment of the compressing mechanism 3 in the feeding system of the present invention, the compressing driver is a compressing drive motor 3820. The compressing unit is a doctor blade assembly 3810 and is connected to the compressing route converter.

In particular, the doctor blade assembly 3810 comprises a blade lever 3812 and a doctor blade 3811 which is provided on the blade lever 3812 and is rotatable around the blade lever 3812.

The compressing route converter comprises a blade gear 3861 and a second gear rack 3855, one end of which is engaged with the blade gear 3861. The rotary shaft of the blade gear 3861 is connected to the blade assembly 3810 and can drive the blade assembly 3810 to rotate. The other end of the second gear rack 3855 is connected to the cam linkage mechanism. The compressing route converter further comprises a compressing rotary arm 3866. The compressing rotary arm 3866 is arranged in parallel to the second gear rack 3855, with one end connecting the doctor blade assembly 3810 and the other end connecting the torque output shaft of a gear retarder. On the compressing rotary arm 3866, there is also provided with a first slide block 3865. The first slide block 3865 is slidably disposed on the first guide rail 3864, the first guide rail 3864 being fixedly connected to the second gear rack 3855.

Particularly, the gear retarder comprises a first gear 3831 which is connected to the output shaft of the compressing drive motor 3820, a second gear 3841 which is engaged with the first gear 3831, a second cam 3842 which is provided on the same driven shaft 3871 with the second gear 3871, a second cam follower 3843 which props against the second cam 3842, a first gear rack 3847 which is connected to the second cam follower 3843, a third gear 3844 which is engaged with the first gear 3847, a fifth gear 3846 which shares the same shaft with the third gear and a fourth gear 3845 which is engaged with the fifth gear. The compressing rotary arm 3866 is connected to the output shaft of the fourth gear 3845. The cam linkage mechanism includes a first cam 3854 and a first cam follower 3863 which props against the first cam 3854. The first cam follower 3863 is connected to the second gear rack 3855. The first cam 3854 and the sixth gear 3853 are fixed on the same actuating shaft 3873. The sixth gear 3853, the seventh gear 3852, the eighth gear 3851 are successively engaged with one another. The eighth gear 3851 and the second cam 3842 are arranged coaxially. Driven by the cam retarder, the compressing rotary arm 3866 can rotate round the actuating shaft 3873. At the same time, the first cam follower 3863 provided at one end of the second gear rack 3855 props against the first cam 3854 and moves along the track of the first cam 3854, so that the second gear rack 3855 and the doctor blade gear 3861 are engaged following the track of the first cam 3854, thereby enabling the blade assembly 3810 to move towards the opening of the bag while being closely against the plane of the bag to squeeze the ingredients out.

Referring now to FIG. 36 to FIG. 39, FIG. 52, and FIG. 53, in the sixth embodiment of the compressing mechanism in the feeding system of the present invention, the compressing unit comprises a fixed compressing unit and a movable compressing unit which can move oppositely driven by the compressing driver. The two compressing units are respectively arranged at both sides of the bag and displace in directions facing each other to squeeze out ingredients inside the bag from the opening of the bag and feed the ingredients into the cooking pot.

Particularly, the fixed compressing unit is a holding plate 331. The movable compressing unit is a movable platen 341, wherein the movable platen 341 comprising an outer frame platen 3441 and a squeezing board 3442 disposed within the outer frame platen 3441. The holding face of the holding plate 331 is planar, and the movable platen 341 is slab-shaped when being static. The compressing route converter has a compressing rod 3212 for connecting the squeezing board 3442. By means of the compressing route converter, when the bag inverting means rotates to the toppling position of the bag, the squeezing board 3442 is displaced towards the holding face of the holding plate 331 to firmly squeeze the bag between the squeezing board 3442 and the holding plate 331 so that ingredients in the bag are squeezed out.

The compressing route converter includes a compressing drive shaft 3211, a compressing rod 3212, a compressing cam 3213, a compressing cam follower wheel 3214, a compressing follower gear 3215, a gear positioning shaft 3216 and a turning plate 1541. The compressing follower gear 3215 is a sector gear. One end face of the turning plate 1541 is movably sheathed by the compressing drive shaft 3211. Driven by the clamping-feeding drive motor (not shown), the turning plate 1541 can rotate round the compressing drive shaft 3211. The turning plate 1541 is provided with an holding plate 331 whose holding face is parallel to the axis of the compressing drive shaft 3211. One end of the compressing rod 3212 comprising a straight line gear rack 3217, while its other end is connected to the compressing cam follower wheel 3214. At the side facing away from the compressing face, the squeezing board 3442 is connected to the compressing follower gear 3215. The compressing follower gear 3215 is engaged with the straight line gear rack 3217 of the compressing rod 3212. The compressing cam 3213 is fixedly mounted and enables the periphery of the compressing cam follower wheel 3214 to be constantly in contact with the compressing cam 3213.

By means of the gear positioning shaft 3216, the squeezing board 3442 is rotatably connected to the turning plate 1541, so that the compressing face of the movable platen 341 faces the holding face of the holding plate 331. The compressing rod 3212 rotates with the turning plate 1541 and at the same time, by means of the compressing cam 3213, the compressing cam follower wheel 3214 and the compressing follower gear 3215, in the process of the turning plate 1541 being turned-over towards the bag toppling position, the compressing cam 3213 simultaneously actuates the compressing rod 3212 to move, thereby driving the compressing follower gear 3215 to rotate. Driven by the compressing follower gear 3215, the squeezing board 3442 rotates around the gear positioning shaft 3216 until it adjoins the holding plate 331, thereby squeezing the bag.

Further, at the middle portion of the turning plate 1541, there is provided with at least one compressing groove 3218 whose axis is perpendicular to the axis of the compressing drive shaft 3211. The compressing rod 3212 is disposed within the compressing groove 3218. By means of the compressing groove 3218 and the compressing cam follower wheel 3214, the compressing rod 3212 rotates together with the turning plate 1541 and has reciprocating straight line displacement within the compressing groove 3218.

Referring to FIG. 40 and FIG. 41, in the seventh embodiment of the compressing mechanism 3 in the feeding system of the present invention, the compressing unit is a push-press unit, comprising a fixed push-press member and a movable push-press member. The fixed push-press member is used for holding the bag. In the present embodiment, the holding plate 333 of the clamping-inverting mechanism is used as the fixed push-press member. The movable push-press member is a compressing rod 3223. The compressing driver is a compressing drive motor 3220 and is fixed to a pallet through a holding plate 3224. The compressing route converter comprises a coupling 3221 and a rotary shaft 3225 which are connected to the output shaft of the compressing drive motor 3220. The compressing rod 3223 is connected to the rotary shaft 3225 through a swing rod 3222. The compressing drive motor 3220 actuates the swing rod 3223 to sway, thereby enabling the compressing rod 3223 to slide along the arc surface of the holding plate 333 to squeeze out ingredients inside the bag which is disposed on the holding plate 333.

Referring to FIG. 42, in the eighth embodiment of the compressing mechanism 3 in the feeding system of the present invention, the compressing unit is a push-press unit, comprising a fixed push-press member and a movable push-press member. The fixed push-press member is the holding plate 333. The movable push-press member is a roller rod 3315. The compressing route converter transmits a torque to the roller rod 3315, enabling the roller rod 3315 to move along the surface of the holding plate 333 when push-pressing the ingredient bag 9. After push-pressing the ingredient bag 9, the roller rod 3315 moves along an arc track, displaces away from surface of the holding plate 333

(please refer to compressing track 330) and returns to the starting position of the roller rod 3315.

Particularly, the holding face of the holding plate 333 is an arc. The roller rod 3315 is a cylindrical rod. The compressing route converter has a sickle-shaped track rod 3314, whose upper end is connected to the roller rod 3315 and which enables the movement track of the rod surface of the roller rod 3315 to be the same with the arc holding face of the holding plate 333, so that the roller rod 3315 is parallel to the opening of the bag. The lower end of the track rod 3314 is hinged with a crank 3321. The other end of the crank 3321 is connected to the output shaft of the motor 3320. The rotation of the motor 3320 can actuate the crank 3321 to rotate. Meanwhile, the track rod 3314 is also provided with a guide rail 3313. One end of a connecting rod 3311 is slidably arranged on the guide rail 3313, while other end of the connecting rod 3311 is hinged with a fixing shaft 3310. The joint action of the crank 3321 and the connecting rod 3311 enables the track rod 3314 to firstly move closely against the arc holding face of the holding plate 333 for prompting the roller rod 3315 to roll the bag held on the holding plate 333. When the roller rod 3315 crosses over the holding plate 333, the track rod 3314 again drives the roller rod 3315 to move away from the arc supporting surface of the holding plate 333 and resets to the original position, thereby preventing the roller rod 3315 from interfering with the bag. In these mechanisms, the track of the compression is formed based on the motion characteristics of the mechanism itself and on the arrangement of each element. The track of the compression can be changed or adjusted by changing the length and/or the length ratios of the crank 3321, the track rod 3314 and the connecting rod 3311.

Other possible embodiments of the compressing mechanism 3 in the feeding system of the present invention (not shown):

The compressing unit may also be a roller unit. The roller unit comprises a fixed roller member and a movable roller member which can move towards the fixed roller member and can press the bag onto the surface of the fixed roller member, the two roller members being respectively disposed at two sides of the toppled bag. The fixed compressing unit may be a holding plate with a planar holding face for holding the bag, and the bag is disposed on the holding face. The movable compressing unit may be a movable platen. The compressing route converter includes a compressing rod for connecting the movable platen, so that the movable platen moves towards the holding face of the holding plate. Driven by the compressing driver, the bag is tightly clamped between the movable platen and the holding plate, so that the ingredients in the bag are squeezed out.

Alternatively, the compressing unit is a winding press unit, comprising a winding shaft which can wind the bag thereon. The axial surface of the winding shaft is arranged at the feeding station and connected to the bag at the end which opposites the open end of the bag. Driven by the compressing driver, the winding shaft rotates, thereby squeezing out the ingredients in the bag from the opening of the bag in the winding process.

Also alternatively, the compressing unit comprises two movable elements which can move in the same direction when driven by the compressing driver. The two movable elements are respectively arranged at the two sides of the bag, and moves in the same direction to compress the bag, thereby squeezing out the ingredients in the bag from the opening of the bag and feeding the ingredients into the cooking pot.

The above-mentioned compressing mechanisms are all provided with a holding plate for holding the bag. The holding plate, on the one hand, can serve as a bag supporting component in the compressing process, and on the other hand, can serve to limit the bag and prevent the bag from leaking due to the deformation of the bag before the feeding.

Referring now to FIG. 43-FIG. 49, the present invention also provides a shaking means 4 in the system for feeding cooking ingredients. Disposed at the feeding station, the shaking means 4 can, under the control of the control system, enable the ingredients in the bag to mix evenly and/or prompt the ingredients in the bag to separate with the bag, by means of vibrating or striking, after the bag is clamped, e.g. before the bag is toppled, in the process of the toppling or upon the completion of the toppling, or before the bag is turned over, in the process of the turning-over or upon the completion of the turning-over, thereby feeding all ingredients into the cooking pot, and preventing some ingredients, e.g. starch ingredients to adhere to the inner surface of the bag in the toppling process.

The shaking means comprises a shaking driver and a shaking unit which can, driven by the shaking driver, shake out the ingredients from the bag by means of striking or vibrating the bag before the bag is toppled, in the process of its being turned-over and toppled or after its being toppled.

The shaking driver can output a rotational torque. The shaking unit can, driven by the shaking driver, move circumferentially and strike the bag, enabling the shaking unit to shake under the drive of the shaking driver and to transfer the shaking to the bag, thereby converting the torque outputted by the shaking driver into the shaking, swaying or reciprocating displacement of the bag, so that the cooking ingredients inside the bag is completely shaken out.

Referring to FIG. 43-FIG. 45, the shaking driver is a shaking drive motor 410. The shaking unit is a short striking rod 423. The striking rod 423 is directly connected to the output shaft of the shaking drive motor 410. The shaking drive motor 410 is disposed on the bag inverting means, to enable the striking rod 423 to, in the rotation process of the output shaft of the shaking drive motor 410, strike the surface of the bag at least once in every rotation cycle, thereby shaking the bag.

The shaking drive motor 410 is disposed on the holding plate 333 of the bag inverting means. The holding plate 333 is integrally formed and has an vertical support face 3332 and a slant curved holding face 3333. The upper end of bag abuts the holding face 3333, and the shaking drive motor 410 is mounted at the back of the holding face 3333 of the holding plate 333. On the holding face 3333 of the holding plate 333, there is also provided with a shaking window 3331 for allowing the striking rod 423 to pass through when striking. The striking rod 423 can, driven by the shaking drive motor 410, pass through the shaking window 3331 to strike the bag which is disposed on the holding plate 333.

Figure 46:
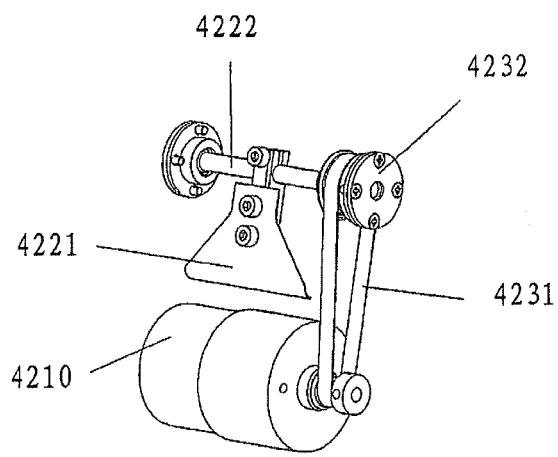
FIG. 46 is a first perspective view showing the structure of embodiment 2 of the shaking means in the feeding system of the present invention.
Figure 47:
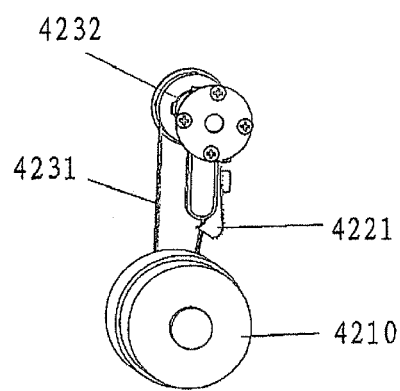
FIG. 47 is a second perspective view showing the structure of embodiment 2 of the shaking means in the feeding system of the present invention.

Referring to FIG. 46-FIG. 47, the shaking drive means is a shaking drive motor 4210, whose output shaft is linked with a pulley 4232 through a synchronous belt 4231. The shaking drive motor 4210 can transfer the rotational torque to the pulley 4232. The pulley 4232 is axially extended with a rotary shaft 4222. The pulley 4232 mobilizes the rotary shaft 4222 to synchronously rotate. The shaking unit is a sheet-shaped striking plate 4221 for striking the bag. One end of the striking plate 4221 is connected to the rotary shaft 4222. When the rotary shaft 4222 rotates, the other end of the striking plate 4221 moves circumferentially and strikes the bag.

Particularly, the striking end of the striking plate 4221 is in the shape of an arcuate thin sheet. The striking plate 4221 bends in a direction which is opposite to the rotational direction of the force output shaft of the shaking drive motor 4210, so as to avoid scratching the bag. In addition, the striking end of the striking plate 4221 is curved, increasing the area on which the bag is stricken and further improving the effect of ingredient feeding.

Figure 48:
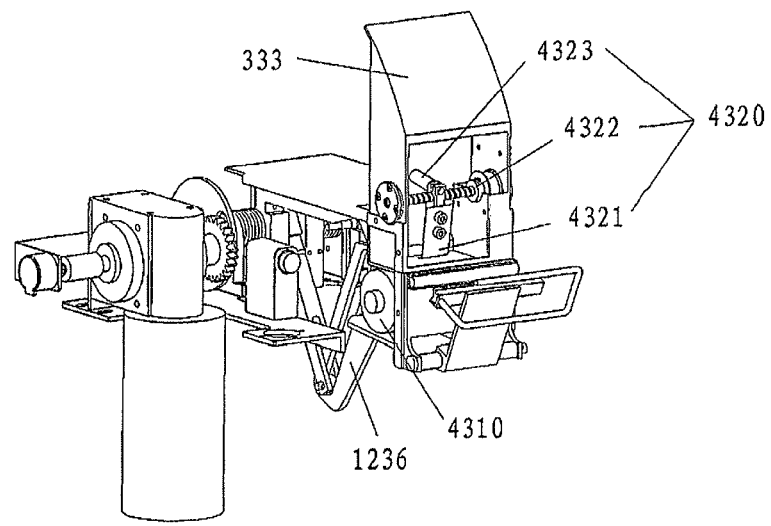
FIG. 48 is a first perspective view showing the structure of embodiment 3 of the shaking means in the feeding system of the present invention.
Figure 49:
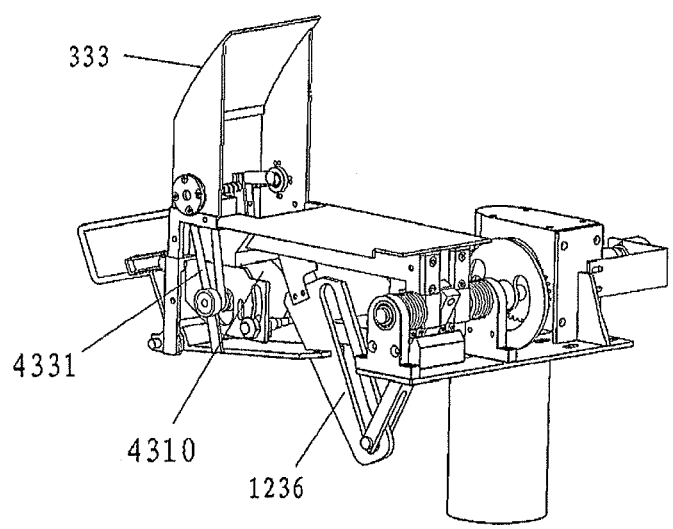
FIG. 49 is a second perspective view showing the structure of embodiment 3 of the shaking means in the feeding system of the present invention.

Reference is now made to FIG. 48, FIG. 49. The shaking unit can be a striking plate assembly 4320, which comprises a striking plate 4321. The striking plate is movable sheathed by a screw rod 4322. The screw rod 4322 is driven to rotate by a shaking drive motor 4210 and is intermittently connected to an electromagnet 4323. When the electromagnet 4323 is functioning, the striking plate 4321 and the screw rod 4322 firmly holds each other. At this time, the shaking drive motor 4210 drives the screw rod 4322 to rotate through a synchronous belt 4331, the striking plate 4321 follows to likewise conduct rotation, thereby striking the bag and completing the action of shaking the ingredients. When electromagnet 4323 stops functioning, the shaking drive motor 4210 drives the screw rod 4322 to rotate through a synchronous belt 4331, and the striking plate 4321 slides to a proper position along the axis of the screw rod 4322. At this position, the electromagnet 4323 starts to function again and repeats the strike. By such an arrangement, the striking plate 4321 intermittently or continuously strikes the bag.

In the various embodiments of the shaking unit, the bag can be vibrated or struck at its middle or lower portion, or at its bottom or at a position in the vicinity of its bottom, or in the vicinity of the clamped position of the bag. The "striking" to the bag can be applied along a direction perpendicular to the plane of the bag or along a direction diagonal to the opening of the bag. Especially for the starch ingredients, by means of vibrating or striking, starch ingredients being deposited in water is changed to be a state that the starch ingredients are mixed evenly with water, thereby improving the quality of dressing the dish with starchy sauce, which is an important part of Chinese cooking.

In the case that a feeding station is provided, ingredients in the bag are enabled to mix evenly and/or the ingredients in the bag are separated with the bag, by means of vibrating or shaking back and forth the ingredients in the bag, after the bag is clamped and before the bag is turned-over and/or toppled or in the process of its being turned-over and/or being toppled.

The shaking unit of the present invention can also be a vibrating means for enabling ingredients in the bag to mix evenly and/or to be separated with the bag, by means of vibrating the bag or moving the bag back and forth or shaking the bag back and forth, before the bag is turned-over and/or toppled and in the process of its being turned-over and/or being toppled. In particular, the vibrating means is a mechanical vibration generator or ultrasonic vibration generator (not shown).

Referring to FIG. 50-FIG. 53, the present invention also provides a bag conveying means 2 in the cooking ingredient feeding system, used for fixedly mounting the bag under the control of the control system before the bag is conveyed to the clamping station, and then conveying each bag to the clamping station. The bag conveying means includes a bag conveying driver, a bag fixing means and a conveying route converter. Each bag is fixedly provided on the bag fixing means, and driven by the bag conveying driver and through the conveying route converter, the bag fixing means rotates or translationally moves, so that each bag is successively conveyed to the clamping station.

Figure 50:
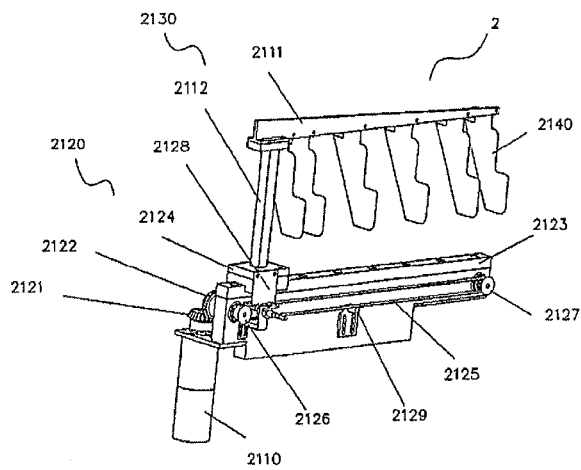
FIG. 50 is a perspective view showing the structure of embodiment 1 of the bag conveying means in the feeding system of the present invention.
Figure 52:
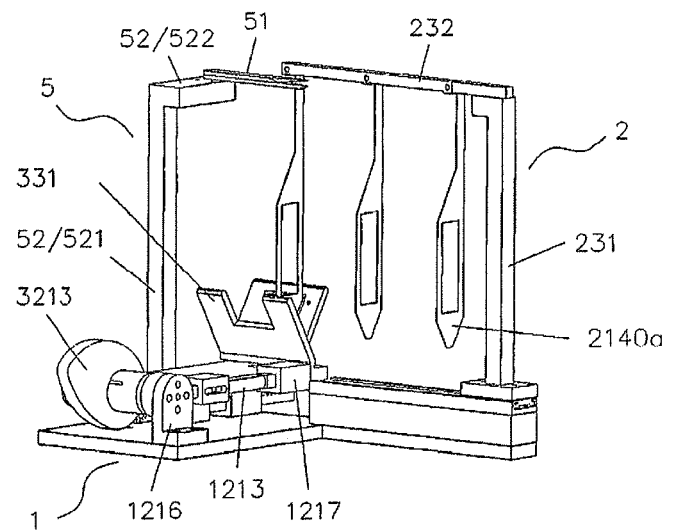
FIG. 52 is a first perspective view showing the structures of embodiment 6 of the compressing means and embodiment 3 of the bag conveying means in the feeding system of the present invention.
Figure 53:
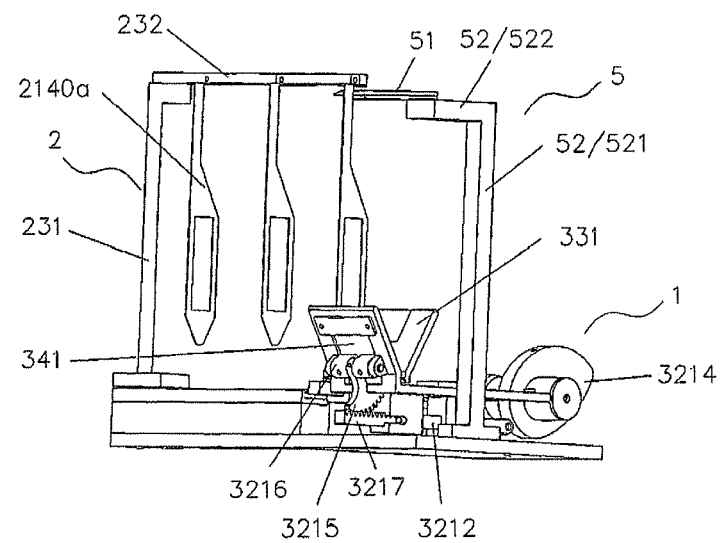
FIG. 53 is a second perspective view showing the structures of embodiment 6 of the compressing means and embodiment 3 of the bag conveying means in the feeding system of the present invention.

Referring to FIG. 50, FIG. 52, FIG. 53, the bag conveying driver is a conveying drive motor 2110. The output shaft of the conveying drive motor 2110 is connected to a conveying route converter 2120. The bag is detachably mounted to the bag fixing means 2130. By the conveying route converter 2120, the rotational displacement of the conveying drive motor 2110 is converted into the conveying displacement for enabling the bag fixing means 2130 to move along a straight line. The bag fixing means 2130 comprises a vertical support rod 2112, and a horizontal bag cantilever beam 2111 which is attached to the top of the bag support rod 2112. On the bag cantilever beam 2111, there is also arranged with a plurality of parallel bag plectrums 2410. The bag plectrums 2410 can, in the conveying process, automatically pull off the bag that have completed ingredient feeding, to make room for the clamping of the next bag. The bag plectrums 2410 may take on different structures or shapes based on actual needs (e.g. the bag plectrums 2410*a* shown in FIG. 52, FIG. 53).

The bag fixing means may also be cylindrical wound structure (not shown). Driven by the bag conveying driver, the wound bag fixing means rotates to successively convey each bag to the bag clamping station.

The conveying route converter 2120 includes a driving bevel gear 2121, a driven bevel gear 2122, a conveying slide rail 2123, a conveying slide block 2124, a conveyor belt 2125, a synchronous transmission driving wheel 2126, a synchronous transmission driven wheel 2127 and a belt connecting member 2128. The driving bevel gear 2121 is connected to the output shaft of the conveying drive motor 2110 and engaged with the driven bevel gear 2122. The driven bevel gear 2122 and the synchronous transmission driving wheel 2126 are coaxially connected to one end of the conveying slide rail 2123. The other end of the conveying slide rail 2123 is connected to the synchronous transmission driven wheel 2127 through a rotary shaft. The conveying slide block 2124 is provided at the bottom of the bag supporting rod 2112, and crosses over the conveying slide rail 2123 and can slide on the conveying slide rail 2123. The conveyor belt 2125 is mounted between the synchronous transmission driving wheel 2126 and the synchronous transmission driven wheel 2127. The belt connecting member 2128 connects the conveying slide block 2124 with the conveyor belt 2125. When the clamp of the feeding device releases the bag, the conveying drive motor 2110 drives the driving bevel gear 2121 and the driven bevel gear 2122 to engage, and then drives the synchronous transmission driving wheel 2126 and the synchronous transmission driven wheel 2127 to rotate, so that the conveying slide block 2124 conducts a conveying displacement along with the conveyor belt 2125. The bag plectrums 2410 follows the bag cantilever beam 2111 to move along the conveying slide rail 2123 and to draw the bag out of the clamping station, preparing for the next feeding. To ensure the reliability of the transmission of the conveyor belt 2125, the conveying route converter 2120 comprises a tensioning block 2129 for supporting the conveyor belt 2125 so as to keep the conveyor belt 2125 in a tension state.

Figure 51:
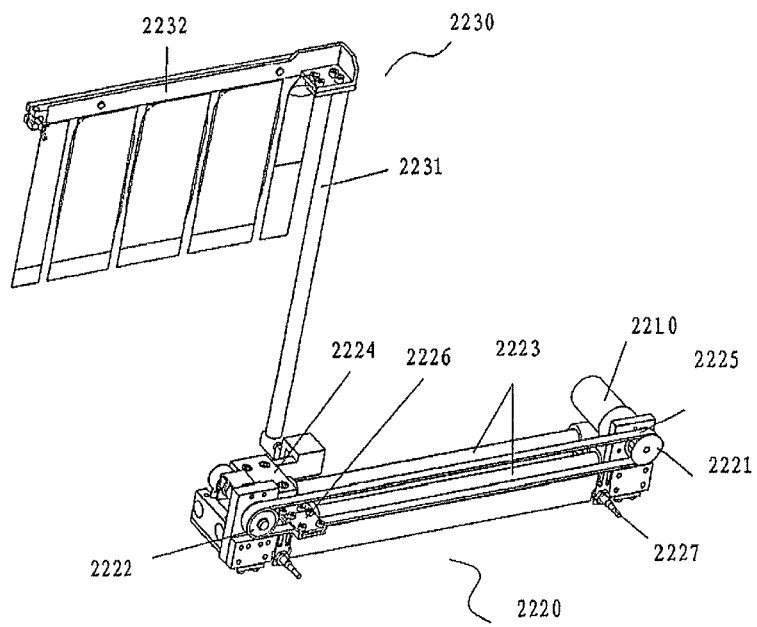
FIG. 51 is a perspective view showing the structure of embodiment 2 of the bag conveying means in the feeding system of the present invention.

Referring to FIG. 51, as another embodiment of the bag conveying means 2 of the present invention, the bag conveying driver is a conveying drive motor 2210. The output shaft of the conveying drive motor 2210 is connected to the conveying route converter 2220. The bag is provided on the bag fixing means 2230. The conveying route converter 2220 converts the rotational displacement of the conveying drive motor 2210 into the straight line conveying displacement of the bag fixing means 2230. The bag fixing means 2230 comprises a vertical support rod 2231 and a bag cantilever beam 2232 which is connected to the top of the bag supporting rod 2231 and is horizontally arranged.

The conveying route converter 2120 comprises a driving wheel 2221, a driven wheel 2222, two slide rails 2223 arranged in parallel, a slide block 2224, a conveyor belt 2225 and a belt connecting member 2226. The driving wheel 2221 is connected to the output shaft of the conveying drive motor 2210 and drives the driven wheel 2222 to rotate through the conveyor belt 2225. The driven wheel 2222 is arranged at one end of the slide rail 2223, while the other end of the slide rail 2223 is fixedly connected to a fixing base of the conveying drive motor 2210. The slide block 2224 is provided at the bottom end of the bag supporting rod 2212, crosses over the two slide rails 2223, and is fixedly connected to the belt 2225 through the belt connecting member 2226. After the clamp of the feeding device releases the bag, the conveying drive motor 2210 drives the driving wheel 2221 and the driven wheel 2122 to rotate, so that the conveying slide block 2124 follows the conveyor belt 2225 to conduct conveying displacement on the slide rail 2223, thereby removing the bag away from the clamping station, preparing for the next feeding.

To ensure the conveyance accuracy and conveyance reliability of the bag conveying means 2, at a position shared by both the driving wheel 2221 and the slide rail 2223, there is also provided with a proximity switch 2227, which, when the slide block 2224 comes to the proximity of the driving wheel 2221 after sliding along the slide rail 2223, can send out commands to the control system to switch off the conveyor drive motor 2210. Compared with the previous embodiment of bag conveying means 2, the sliding structure in this embodiment is more stable, reliable and less costly.

Figure 54:
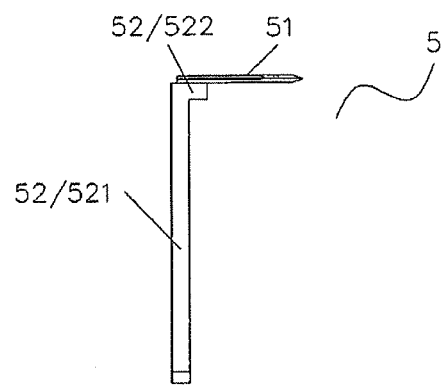
FIG. 54 is a front view showing the structure of an embodiment of the opening means in the feeding system of the present invention.
Figure 55:
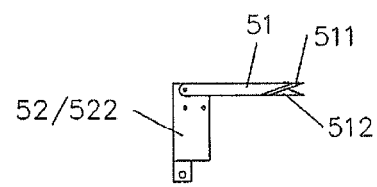
FIG. 55 is a top view showing the structure of the embodiment of the opening means in the feeding system of the present invention.

Referring to FIGS. 54 and 55, the present invention also provides a bag opening means 5 for opening bag containing cooking ingredients, used in the system for feeding cooking ingredients. The bag opening means 5 can, by means of an automatic control system and a cooking execution system, automatically open the sealing of the bag, to facilitate feeding of ingredients after the bag is turned-over at the feeding station. The bag opening means 5 can be arranged at the route on which the bag is conveyed to the clamping station.

The bag opening means 5 is disposed at one end of the bag and can open the bag at this position. The bag clamping means disposed at the clamping station is arranged at the opposite or lateral side of the bag opening means 5 and clamps the ingredient bag 9 under the drive by the clamping driver.

Alternatively, the bag opening means 5 is disposed at the upper end of the ingredient bag 9, and opens the ingredient bag 9 at this position. The bag clamping means is disposed at the clamping station and at the lower end or one side of the bag. The bag clamping means clamps the lower end or one side of the ingredient bag 9 under the drive of the clamping driver.

Referring to FIG. 54, FIG. 55, the bag opening means 5 includes a bag cutter 51 and a bracket 52 for securing the bag cutter 51. The bag cutter 51 is fixed at the top of the bracket 52, and is disposed right above the hinge between a fixed clamping plate and a rotational clamping plate in the bag clamping means 3, and is disposed at one side of a bag supporting rod. The bag cutter 51 can cut open the sealed opening which is at the upper end of the ingredient bag 9, which is clamped between the fixed clamping plate and the rotational clamping plate, preparing the ingredient bag 9 for subsequent feeding steps.

Particularly, the bag cutter 51 comprises a set of blades 511, 512 for cutting the bag. The blade 511 contacts the edge of the blade 512, resembling a pair of scissors. The blades 511 and 512 form an acute angle with the conveying path of the bag. The blade 511 contacts the edge of the blade 512, resembling a pair of scissors, so that the bag, which is clamped between the blades 511, 512, is cut open rectilinearly along the direction of its movement, and produces a flat opening. According to actual needs, the cutter 51 may have only one blade. For example, the blade 512 can be replaced by a baffle to limit the position of the bag so as to facilitate cutting.

The bracket 51 can fix the bag cutter 51, so that the intersection between the blade 511 and blade 512 is at the conveyance path of the ingredient bag 9 and is at a position that the ingredient bag 9 will pass before it enters the feeding station.

The bracket 52 includes a vertical supporting rod 521 and a horizontally-arranged positioning rod 522 which is connected to the top of the supporting rod 521. The positioning rod 522 is used for fixing and supporting the bag cutter 51 and in the meantime, for enhancing the stability of the bag cutter 51 in the cutting process.

Of course, the bag cutter 5 is not limited to above forms. It is also possible to use rotary shears and hot melt shears, etc., as long as the bag in its moving process can be rectilinearly cut open along its moving direction. The bag may be cut, i.e. by means of moving a cutter to cut a fixed bag; by means of moving a bag to meet a static cutter, or by means of the relative movement of both the cutter and the bag.

Figure 56:
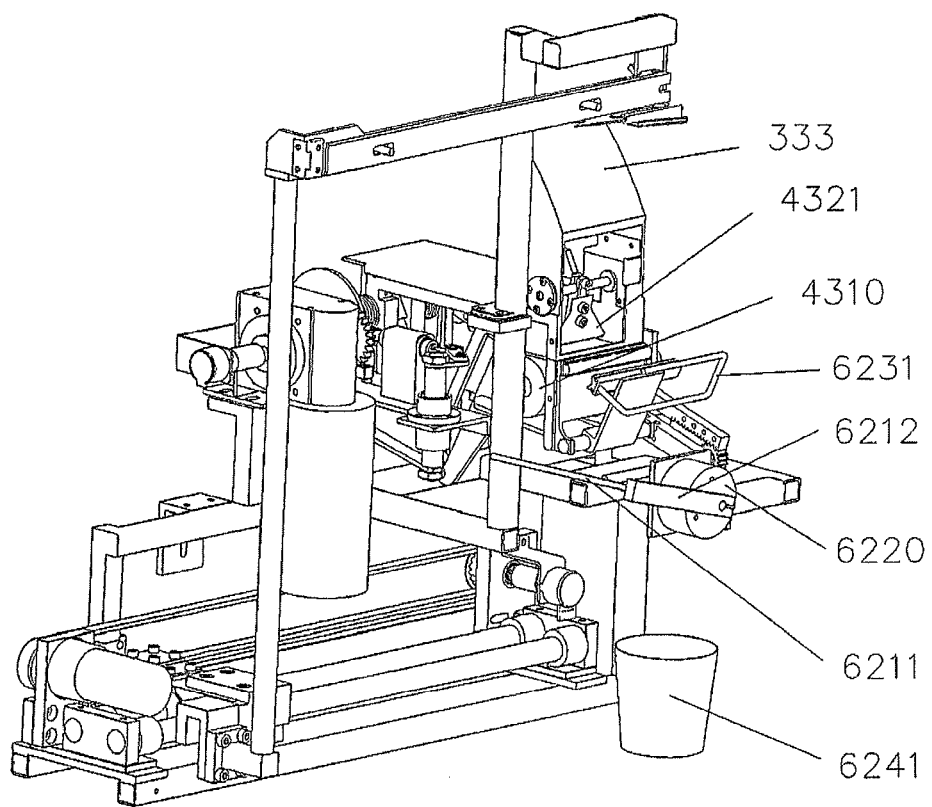
FIG. 56 is a perspective view showing the structure of an embodiment of the bag recycling means in the feeding system of the present invention.

Referring to FIG. 56, the feeding system of the present invention further provides an ingredient bag recycling unit 6, which, controlled by a control system, is used for automatically recycling the empty bag that have completed the process of feeding and have returned to the clamping station. The ingredient bag recycling unit 6 comprises a bag recycling conveying means for recycling the bag at the clamping station, a bag recycling conveying driver and a bag recycling container. The bag recycling conveying driver is disposed at the clamping station. The bag recycling container is arranged below the bag recycling conveying means.

Particularly, the bag recycling conveying driver 6220 is a rotatable electromagnet; or, the bag recycling conveying driver 6220 is a drive motor.

The bag recycling conveying means is a pushing means, which, driven by the bag recycling conveying driver 6220, pushes the bag 9 into the bag recycling container 6241; or pushes the bag 9 to be over the bag recycling container 6241, and then the bag 9 falls into the bag recycling container 6241 under gravity.

Particularly, the pushing means comprises a lever (not shown) which props against one side of the ingredient bag 9 which is clamped by the clamp of the bag clamping means. The lever is directly connected to the bag recycling conveying driver 6220, and the bag recycling conveying driver 6220 drives the lever to do a rectilinearly push so that the bag 9 at the clamping station is pushed to fall into the bag recycling container 6241.

Alternatively, as shown in FIG. 56, the pushing means comprises a lever 6211, which props against one side of the ingredient bag 9 which is clamped by the clamp of the bag clamping means. The lever 6211 is disposed at the top of a rotary arm 6212. The bottom of the rotary arm 6212 is connected to the output shaft of the recycling conveying driver 6220. The recycling conveying driver 6220 drives the lever 6211 to push the bag 9 in an arc, pushing the ingredient bag 9 from the clamping station to fall into the bag recycling container 6241.

Further, the bag recycling means 6 further comprises a protective element 6231 for preventing the ingredient bag 9 from falling backwards. The protective element 6231 is fixed to the clamp in the bag clamping means to avoid the bag 9 from falling to positions other than the bag recycling container 6241.

The above-described embodiments are merely preferred embodiments of the invention. They are not intended to limit this invention. Any modifications, equivalent replacement and improvements, etc. within the spirit and principles of the present invention should be included in the protection scope of the present invention.

The invention claimed is:

1. A method for feeding cooking ingredients, in which cooking ingredients contained in an ingredient bag are put into a cooking pot under the control of a control system, the method comprising the steps of:
   arranging a clamping station at a position within the vicinity of the pot mouth but out of the pot mouth area for clamping the ingredient bag at the clamping station in an automatic or semi-automatic manner or for clamping the ingredient bag by a bag clamping means;
   limiting the ingredient bag in such a way that the ingredient bag maintains a desirable state when being clamped and is prevented from being deformed during the feeding process;
   turning over and/or toppling the ingredient bag for inputting the ingredients in the ingredient bag into the pot at a position in the vicinity of the pot mouth; and
   moving the ingredient bag away from the pot mouth area and releasing the ingredient bag from being clamped after the ingredients are fed,
   wherein said limiting of the ingredient bag includes limiting the state of the ingredient bag when it is in a static state or being conveyed, limiting the state of the ingredient bag when it is being turned-over and/or toppled, limiting the ingredient bag on the moving direction of the ingredient bag, limiting the ingredient bag on the direction opposite the moving direction of the ingredient bag, and/or limiting the ingredient bag on the direction perpendicular to the moving direction of the ingredient bag, and
   wherein said limiting of the ingredient bag is applied in such a way that the opening of the ingredient bag remains substantially perpendicular to the moving route of the ingredient bag.

2. The method for feeding cooking ingredients according to claim 1, wherein a feeding station is arranged between the clamping station and the pot at a position in the vicinity of the pot mouth; and before or when the clamped ingredient bag is turned-over and/or toppled, the ingredient bag is conveyed from the clamping station to the feeding station.

3. The method for feeding cooking ingredients according to claim 1, wherein the method further comprises the step of: vibrating and/or striking the ingredient bag in such a way that the ingredients inside the ingredient bag are uniformly mixed and/or the ingredients inside the ingredient bag are separated from the ingredient bag.

4. The method for feeding cooking ingredients according to claim 1, wherein the method further comprises the step of: compressing the ingredient bag in such a way that the ingredients inside the ingredient bag are separated from the ingredient bag wherein said compressing of the ingredient bag comprises unidirectionally or bidirectionally compressing the ingredient bag, pressing or clamping the ingredient bag and push-pressing or rolling over the ingredient bag towards the opening of the ingredient bag, and winding the ingredient bag in such a way that the ingredients contained in the ingredient bag are squeezed out.

5. A system for feeding cooking ingredients contained in at least one of the ingredient bags into a cooking pot by means of an automatic control system and a cooking execution system, wherein the feeding system comprises a feeding device which, under the control of the automatic control system, clamps the ingredient bag at a clamping station, limits the clamped bag, turns over and/or topples the ingredient bag to pour the ingredients inside the ingredient bag into the cooking pot, and then removes the empty bag from the pot mouth area,
   wherein the feeding device is a mechanism selected from the group consisting of
   i. a clamping, conveying and toppling mechanism, comprising: a bag clamping means for clamping the ingredient bag and for limiting the ingredient bag, an inter-station conveying means for driving the ingredient bag which is being clamped by the bag clamping means to move between the clamping station and the feeding station, and an ingredient toppling means for automatically pouring the ingredients inside the ingredient bag into the cooking pot,
   ii. a clamping-conveying and toppling mechanism, comprising: a clamping-conveying means which is used for automatically clamping the ingredient bag and limiting the state of the clamped bag and for automatically moving the clamped bag between the clamping station and the feeding station, and an ingredient toppling means used for automatically toppling the ingredient bag to pour the ingredients inside the ingredient bag into the cooking pot,
   iii. a clamping-toppling and conveying mechanism, comprising: a clamping-toppling means for clamping the ingredient bag and limiting the state of the ingredient bag and for automatically pouring the ingredients inside the ingredient bag into the cooking pot, and an inter-station conveying means for driving the ingredient bag which is clamped by the clamping-toppling means to move between the clamping station and the feeding station, and
   iv. a clamping and conveying-toppling mechanism, comprising: a bag clamping means for clamping
      the ingredient bag and limiting the state of the ingredient bag, and a conveying-toppling means for driving the ingredient bag which is clamped by the clamping-toppling means to move between the clamping station and the feeding station and for automatically pouring the ingredients inside the ingredient bag into the cooking pot.

6. The system for feeding cooking ingredients according to claim 5, wherein the bag clamping means comprises a clamp for clamping the ingredient bag, a clamping driver and a clamping route converter in which the clamp is disposed at the clamping station for clamping or releasing the ingredient bag and the clamping route converter is disposed between the clamp and the clamping driver and is provided for converting the torque outputted by the clamp driver into the clamping torque for driving the clamp to clamp the ingredient bag, and into a releasing torque for releasing the ingredient bag.

7. The system for feeding cooking ingredients according to claim 5, wherein the inter-station conveying means comprises an inter-station conveying driver and an inter-station conveying route converter in which the inter-station conveying route converter is disposed between the bag clamping means and the inter-station conveying driver for converting the torque outputted by the inter-station driver into the torque for driving the bag clamping means to move between the clamping station and the feeding station.

8. The system for feeding cooking ingredients according to claim 5, wherein the ingredient toppling means comprises a toppling driver and a toppling route converter in which the toppling route converter is used for converting the torque which is outputted by the toppling driver into a toppling torque for driving the bag clamping means or the inter-station conveying means which is connected to the bag clamping means to topple the ingredient bag at the feeding station and into a returning torque for allowing the bag clamping means or the inter-station conveying means which is connected to the bag clamping means to reset to a state before toppling.

9. The system for feeding cooking ingredients according to claim 5, wherein the clamping-conveying means comprises a clamp, a clamping-conveying driver and a clamping-conveying route converter, and wherein the clamp is used to clamp or release the ingredient bag, and the clamping-conveying route converter is disposed between the clamp and the clamping-conveying driver, used for converting the torque outputted by the clamping-conveying driver into the clamping torque for driving the clamp to clamp the ingredient bag and into the releasing torque for releasing the ingredient bag, and also used for converting the torque outputted by the clamping-conveying driver into the torque for driving the clamp which clamps the ingredient bag to move between the clamping station and the feeding station.

10. The system for feeding cooking ingredients according to claim 9, wherein the ingredient toppling means comprises a toppling driver for causing the ingredient bag to topple and for allowing the clamping-conveying means to turn over or reset and a toppling route converter, and wherein the toppling route converter is disposed between the clamping-conveying means and the toppling driver, and is provided for converting the torque outputted by the toppling driver into the toppling torque for driving the clamping-conveying means to pour out the ingredients in the ingredient bag at the feeding station, and into the returning torque for driving the clamping-conveying means to reset to a state before toppling.

11. The system for feeding cooking ingredients according to claim 5, wherein the clamping-toppling means comprises a clamp, a clamping-toppling driver and a clamping-toppling route converter in which the clamp is used for clamping or releasing the ingredient bag, and the clamping-toppling route converter is disposed between the clamping-toppling driver and the clamp, and wherein when the clamp is at the clamping station the clamping-toppling route converter is used for converting the torque outputted by the clamping-toppling driver into the clamping torque for driving the clamp to clamp the ingredient bag and into the releasing torque for releasing the ingredient bag, and when the clamp is at the feeding station the clamping-toppling route converter is used for converting the torque outputted by the clamping-toppling driver into the toppling torque for driving the clamped bag to topple at the feeding station, and into the returning torque for driving the clamped bag to return to a state before toppling.

12. The system for feeding cooking ingredients according to claim 5, wherein the conveying-toppling means comprises a conveying-toppling driver and a conveying-toppling route converter in which the conveying-toppling route converter is disposed between the bag clamping means and the conveying-toppling driver, used for converting the torque outputted by the conveying-toppling driver into the torque for driving the bag clamping means to move between the clamping station and the feeding station, and for converting the torque outputted by the toppling driver into the toppling torque for driving the bag clamping means to topple the ingredient bag at the feeding station, and into a returning torque for driving the bag clamping means to reset to a state before toppling.

13. A system for feeding cooking ingredients contained in at least one of the ingredient bags into a cooking pot by means of an automatic control system and a cooking execution system, wherein the feeding system comprises a feeding device which, under the control of the automatic control system, clamps the ingredient bag at a clamping station, limits the clamped bag, turns over and/or topples the ingredient bag to pour the ingredients inside the ingredient bag into the cooking pot, and then removes the empty bag from the pot mouth area, wherein the feeding device is a clamping-inverting feeding mechanism in which the clamping-inverting feeding mechanism is arranged at the feeding station and comprises a clamping-feeding driver, a clamping-feeding route converter, a bag clamping means for clamping and limiting the ingredient bag at the feeding station, and a bag inverting means for turning-over the ingredient bag and pouring the ingredients inside the ingredient bag into the cooking pot, wherein the clamping-feeding driver is a clamping-feeding drive motor and the clamping-feeding route converter is connected to the output shaft of the clamping-feeding drive motor, used for converting the rotational torque, which is inputted to the clamping-feeding route converter by the clamping-feeding drive motor, into the rotational torque which is outputted to the bag inverting means, and used for converting the rotational displacement, which is inputted by the clamping-feeding drive motor, into the clamping displacement which is outputted to the bag clamping means for clamping the ingredient bag and into the releasing displacement for releasing the ingredient bag, wherein the bag clamping means comprises a fixed clamping plate and a movable clamping plate in which the fixed clamping plate and the movable clamping plate are respectively provided with buckle structures which is mutually buckled, and the movable clamping plate is connected to the clamping-feeding route converter, and wherein the bag inverting means is a turning plate.

14. A system for feeding cooking ingredients contained in at least one of the ingredient bags into a cooking pot by means of an automatic control system and a cooking execution system, wherein the feeding system comprises a feeding device which, under the control of the automatic control system, clamps the ingredient bag at a clamping station, limits the clamped bag, turns over and/or topples the ingredient bag to pour the ingredients inside the ingredient bag into the cooking pot, and then removes the empty bag from the pot mouth area, wherein the feeding device is a clamping and toppling mechanism, comprising a bag clamping means for clamping and limiting the ingredient bag, an ingredient toppling means for automatically pouring the ingredients inside the ingredient bag into the cooking pot, and a cutting means for cutting one side of the ingredient bag before pouring out the ingredients, wherein the bag clamping means comprises a clamp, a clamping driver and a clamping route converter in which the clamp is disposed at the clamping station for clamping or releasing the ingredient bag and the clamping route converter is used for converting the torque outputted by the clamping driver into the clamping torque for driving the clamp to clamp the ingredient bag or into the releasing torque for releasing the ingredient bag, wherein the clamping driver is a clamping drive motor and the bag clamping means comprises a fixed clamping head and a movable clamping head which are arranged at opposing positions.

15. The system for feeding cooking ingredients according to claim 5, further comprising a compressing mechanism which is used to squeeze the ingredients out of the ingredient bag under the control of the control system, wherein the compressing mechanism comprises a compressing driver and a compressing unit which, driven by the compressing driver, compresses the toppled bag to squeeze the ingredients out of the bag and to feed them into the cooking pot, wherein the compressing mechanism further comprises a compressing route converter which outputs a torque to the compressing unit and converts the torque inputted by the compressing driver into the compressing torque of the compressing unit and into a displacement torque for pushing the compressing unit to displace while compressing the ingredient bag, and wherein the compressing route converter is connected to the compressing driver.

16. The system for feeding cooking ingredients according to claim 5, further comprising a shaking means for enabling the ingredients to mix or shaking the ingredients out of the ingredient bag by means of vibrating or striking the ingredient bag under the control of the control system before or after the ingredient bag is clamped and thereby feeding the ingredients into the cooking pot, wherein the shaking means is arranged at the clamping station or the feeding station and comprises a shaking driver and a shaking unit which strikes or vibrates the ingredient bag when driven by the shaking driver.

17. The system for feeding cooking ingredients according to claim 5, further comprising an ingredient bag conveying means for fixedly mounting the ingredient bag and for conveying each bag to the clamping station under the control of the control system, wherein the ingredient bag conveying means comprises an ingredient bag conveying driver and an ingredient bag fixing means, each bag is fixedly provided on the ingredient bag fixing means, and the ingredient bag fixing means rotates or translationally moves in such a way that each bag is successively conveyed to the clamping station when driven by the ingredient bag conveying driver.

* * * * *